(12) United States Patent
Sun et al.

(10) Patent No.: US 8,559,908 B2
(45) Date of Patent: Oct. 15, 2013

(54) JAMMING GRAPH AND ITS APPLICATION IN NETWORK RESOURCE ASSIGNMENT

(75) Inventors: Jing Sun, San Diego, CA (US); Aamod D. Khandekar, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 457 days.

(21) Appl. No.: 12/482,885

(22) Filed: Jun. 11, 2009

(65) Prior Publication Data

US 2009/0310554 A1     Dec. 17, 2009

Related U.S. Application Data

(60) Provisional application No. 61/061,966, filed on Jun. 16, 2008, provisional application No. 61/089,438, filed on Aug. 15, 2008.

(51) Int. Cl.
     *H04M 11/00*      (2006.01)

(52) U.S. Cl.
     USPC ........................................................ 455/403

(58) Field of Classification Search
None
See application file for complete search history.

(56) References Cited

U.S. PATENT DOCUMENTS

| | | | | |
|---|---|---|---|---|
| 5,168,575 A * | 12/1992 | Cizek et al. | ............... | 455/514 |
| 5,758,090 A * | 5/1998 | Doner | ........................ | 709/236 |
| 5,781,536 A * | 7/1998 | Ahmadi et al. | ............ | 370/252 |
| 6,744,743 B2 * | 6/2004 | Walton et al. | ............. | 370/318 |
| 7,020,878 B1 * | 3/2006 | Rhee et al. | ................ | 718/104 |
| 7,174,170 B2 | 2/2007 | Steer et al. | | |
| 8,014,785 B2 * | 9/2011 | Zhao et al. | ................ | 455/452.2 |
| 2004/0239559 A1 * | 12/2004 | King et al. | ............. | 342/357.12 |
| 2005/0096062 A1 | 5/2005 | Ji et al. | | |

(Continued)

FOREIGN PATENT DOCUMENTS

| CN | 1954629 A | 4/2007 |
|---|---|---|
| EP | 1257092 A1 | 11/2002 |

(Continued)

OTHER PUBLICATIONS

Riihijarvi J et al: "Frequency Allocation for WLANs Using Graph Colouring Techniques" Wireless On-Demand Network Systems and Services, 2005. WONS 2005. SECO ND Annual Conference on St. Moritz, Switzerland Jan. 19-21, 2005, Piscataway, NJ, USA,IEEE, Jan. 19, 2005, pp. 216-222, XP010770015 ISBN: 978-0-7695-2290-6 paragraph [0002].

(Continued)

*Primary Examiner* — Fan Ng
(74) *Attorney, Agent, or Firm* — Kam T. Tam

(57) ABSTRACT

A wireless communication network uses backhaul negotiation based upon static and dynamic resource assignment on jamming graphs. Static reuse factor design methods including fractional frequency reuse (FFR) are addressed. The jamming graph is used to summarize the interfering relationship between transmitters (nodes in the jamming graph). Negotiation-based algorithm is used to arrive at a static resource assignment so that a large reuse factor can be achieved while jamming scenario can be avoided. As a result of such algorithm, each transmitter is assigned some resources, over which traffic transmission can be done instantaneously to reduce the packet delay for short packets. Based on the result of static resource negotiation algorithm, a dynamic resource algorithm can be run, such that the resources assigned to different nodes can be share in a bursty traffic scenario to further reduce packet delay for larger packet size cases, while jamming be also avoided.

38 Claims, 25 Drawing Sheets

(56) References Cited

U.S. PATENT DOCUMENTS

| | | | | |
|---|---|---|---|---|
| 2005/0163194 | A1 | 7/2005 | Gore et al. | |
| 2006/0209721 | A1* | 9/2006 | Mese et al. | 370/254 |
| 2007/0140168 | A1* | 6/2007 | Laroia et al. | 370/330 |
| 2007/0253355 | A1* | 11/2007 | Hande et al. | 370/328 |
| 2007/0281708 | A1* | 12/2007 | Bakhuizen et al. | 455/450 |

FOREIGN PATENT DOCUMENTS

| | | |
|---|---|---|
| EP | 1758414 A1 | 2/2007 |
| JP | 4297137 A | 10/1992 |
| JP | 7007760 A | 1/1995 |
| JP | 11331925 A | 11/1999 |
| JP | 2002506334 T2 | 2/2002 |
| JP | 2008288932 A | 11/2008 |
| JP | 2011512046 A | 4/2011 |
| WO | WO2007024895 A2 | 3/2007 |
| WO | WO2007048304 A1 | 5/2007 |

OTHER PUBLICATIONS

Taiwan Search Report—TW098119782—TIPO—Jan. 17, 2013.

* cited by examiner

JAMMING GRAPH AND ITS APPLICATION IN NETWORK RESOURCE ASSIGNMENT

CLAIM OF PRIORITY UNDER 35 U.S.C. §119

The present application claims priority to provisional U.S. application Ser. No. 61/061,966, filed Jun. 16, 2008, entitled "JAMMING GRAPH AND ITS APPLICATION IN LONG TERM RESOURCE ASSIGNMENT", assigned to the assignee hereof, and incorporated herein by reference in its entirety. The present application also claims priority to provisional U.S. application Ser. No. 61/089,438, filed Aug. 15, 2008, entitled "JAMMING GRAPH AND ITS APPLICATION IN LONG TERM RESOURCE ASSIGNMENT", assigned to the assignee hereof, and incorporated herein by reference in its entirety.

BACKGROUND

1. Field

The present disclosure relates generally to communication, and more specifically to techniques for transmitting information in a wireless communication network.

2. Background

In recent years, users have started to replace fixed line communications with mobile communications and have increasingly demanded great voice quality, reliable service, and low prices. Typical radio access cellular networks operate by way of various radio transmission devices, or base stations. These base stations provide wireless access to wireless mobile devices, such as cellular phones, to a core network of a cellular service provider. The base stations along with various data routing and control mechanisms (e.g., base station controllers, core and edge routers, and so on) facilitate remote communication for the mobile devices. As communication service providers expand base station coverage, more land areas can be covered by the radio access network. Thus, wireless communication systems are widely deployed to provide various types of communication (e.g., voice, data, multimedia services, etc.) to multiple users. As the demand for high-rate and multimedia data services rapidly grows, there lies a challenge to implement efficient and robust communication systems with enhanced performance.

In a wireless network, sometimes the transmission from multiple transmitters cannot happen at the same time, or they will cause serious interference to each other (jamming). For instance, a terminal served by a node can receive jamming interference from another node that is using the same resources. By contrast, a terminal within reception range of a serving node and a potentially jamming node can be spared this situation if different resources are being used by the respective nodes.

SUMMARY

The following presents a simplified summary in order to provide a basic understanding of some aspects of the disclosed aspects. This summary is not an extensive overview and is intended to neither identify key or critical elements nor delineate the scope of such aspects. Its purpose is to present some concepts of the described features in a simplified form as a prelude to the more detailed description that is presented later.

In accordance with one or more aspects and corresponding disclosure thereof, various aspects are described in connection with allocating resources in a wireless communication network to reduce jamming of a terminal by a neighboring node. In a mixed macro, pico, and femto deployment, we usually see cases that the transmission from one transmitter to a receiver will cause severe interference to another transmission. In this case, there is a need to orthogonalize the transmissions by assigning orthogonal resources to the transmitters. On the other hand, if two transmissions do not interfere with each other, the same resource can be reused. For each node (transmitter) in the system, we would like it to have some statically assigned resources, so that some degree of service can be guaranteed. Furthermore, we would like to have some freedom to move resources between nodes, such that when we have bursty traffic, a node can temporarily borrow resources from others to accelerate the transmission of its packets.

In one aspect, a method is provided for allocating wireless resources between nodes. Over-the-air resources are determined used by a node and used by neighboring nodes of a neighborhood. A report is accessed indicating that a selected node is jamming another node in the neighborhood. A jamming graph is maintained that links nodes in the neighborhood based upon a jamming relationship between respective pairs of nodes. Backhaul signaling to a neighboring node is for negotiating to assign resources for efficient resource use without shared resource use between a pair of nodes in a jamming relationship.

In another aspect, a computer program product is for allocating wireless resources between nodes. Computer readable storage medium has stored thereon the following computer executable components: A first set of instructions is for determining over-the-air resources used by a node and used by neighboring nodes of a neighborhood. A second set of instructions is for accessing a report indicating that a selected node is jamming another node in the neighborhood. A third set of instructions is for maintaining a jamming graph that links nodes in the neighborhood based upon a jamming relationship between respective pairs of nodes. A fourth set of instructions is for negotiating by backhaul signaling to a neighboring node to assign resources for efficient resource use without shared resource use between a pair of nodes in a jamming relationship.

In an additional aspect, an apparatus is provided for allocating wireless resources between nodes. At least one computer readable storage medium is for storing computer executable instructions that when executed by the at least one processor implement components: Means is provided for determining over-the-air resources used by a node and used by neighboring nodes of a neighborhood. Means is provided for accessing a report indicating that a selected node is jamming another node in the neighborhood. Means is provided for maintaining a jamming graph that links nodes in the neighborhood based upon a jamming relationship between respective pairs of nodes. Means is provided for negotiating by backhaul signaling to a neighboring node to assign resources for efficient resource use without shared resource use between a pair of nodes in a jamming relationship.

In a further aspect, an apparatus is provided for allocating wireless resources between nodes. A transmitter is for transmitting data packet communication to a served terminal. A receiver is for receiving data packet communication from the served terminal. A backhaul communication component is for determining over-the-air resources used by a node and used by neighboring nodes of a neighborhood; for accessing a report indicating that a selected node is jamming another node in the neighborhood; for maintaining a jamming graph that links nodes in the neighborhood based upon a jamming relationship between respective pairs of nodes; and for negotiating by backhaul signaling to a neighboring node to assign resources for efficient resource use without shared resource use between a pair of nodes in a jamming relationship.

In yet one aspect, a method is provided for transmitting data packet communication by employing a processor executing computer executable instructions stored on a computer readable storage medium to implement the following acts: A data packet is received for transmission at a first node in communication with a neighboring node of a network neighborhood. Information is accessed for statically-assigned over-the-air resources not being used by the neighboring node. A temporary grant is requested for the resources from the neighboring node. A grant is received for the resources from the neighboring node. The data packet is transmitted using the granted resources.

In yet another aspect, a computer program product is provided for transmitting data packet communication by employing at least one computer readable storage medium storing computer executable instructions that when executed by at least one processor implement components: A first set of instructions is for receiving a data packet for transmission at a first node in communication with a neighboring node of a network neighborhood. A second set of instructions is for accessing information for statically-assigned over-the-air resources not being used by the neighboring node. A third set of instructions is for requesting a temporary grant for the resources from the neighboring node. A fourth set of instructions is for receiving a grant for the resources from the neighboring node. A fifth set of instructions is for transmitting the data packet using the granted resources.

In yet an additional aspect, an apparatus is provided for transmitting data packet communication. Means are provided for employing a processor executing computer executable instructions stored on a computer readable storage medium to implement the following acts. Means are provided for receiving a data packet for transmission at a first node in communication with a neighboring node of a network neighborhood. Means are provided for accessing information for statically-assigned over-the-air resources not being used by the neighboring node. Means are provided for requesting a temporary grant for the resources from the neighboring node. Means are provided for receiving a grant for the resources from the neighboring node. Means are provided for transmitting the data packet using the granted resources.

In yet a further aspect, an apparatus is provided for transmitting data packet communication. A receiver is for receiving a data packet for transmission at a first node in communication with a neighboring node of a network neighborhood. A computer readable storage medium is for accessing information for statically-assigned over-the-air resources not being used by the neighboring node. A backhaul communication component is for requesting a temporary grant for the resources from the neighboring node and for receiving a grant for the resources from the neighboring nodes. A transmitter is for transmitting the data packet using the granted resources.

To the accomplishment of the foregoing and related ends, one or more aspects comprise the features hereinafter fully described and particularly pointed out in the claims. The following description and the annexed drawings set forth in detail certain illustrative aspects and are indicative of but a few of the various ways in which the principles of the aspects may be employed. Other advantages and novel features will become apparent from the following detailed description when considered in conjunction with the drawings and the disclosed aspects are intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DETAILED DESCRIPTION

In a wireless network, sometimes the transmission from multiple transmitters cannot happen at the same time, or they will cause serious interference to each other (jamming). In this innovation, we disclose backhaul negotiation based methods that can assign resources between transmitters both statically and dynamically. More specifically, if the system supports CDMA, the resources could be in code domain; if the system supports FDMA or OFDMA, the resource could be in frequency domain; if the system supports TDMA, the resource could be in time domain; if the system supports SDMA, the resource could be in spatial domain. By using this mechanism, large resource reuse factor can be achieved. Furthermore, resources can be shared dynamically between transmitters so that the perceived user data rate can be improved under the bursty traffic scenario.

If nothing is done for the jamming scenario, we can use reuse factor of 1 on all resources. The transmissions from non-cooperative transmitters jamming each other will have low signal to interference and noise ratio (SINR) and the spectral efficiency will be low. To improve over this, a lower reuse factor can be used, such that different transmitter uses different time/frequency/code/spatial resource and the SINR of the transmissions can be improved at the cost of lower resource usage. As some combination of the above two methods, fractional frequency reuse (FFR) can be used, where some of the resources use reuse factor 1 and some other resources use lower reuse factor. In both low reuse factor and FFR, the reuse patterns need to be manually designed and are static (does not reflect the traffic pattern change). Similar concept could be extended to time/code/spatial domain reuse. For example, simultaneous transmissions from transmitters with multiple transmit antennas could be orthogonalized by choosing proper spatial modes.

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

Figure 1:
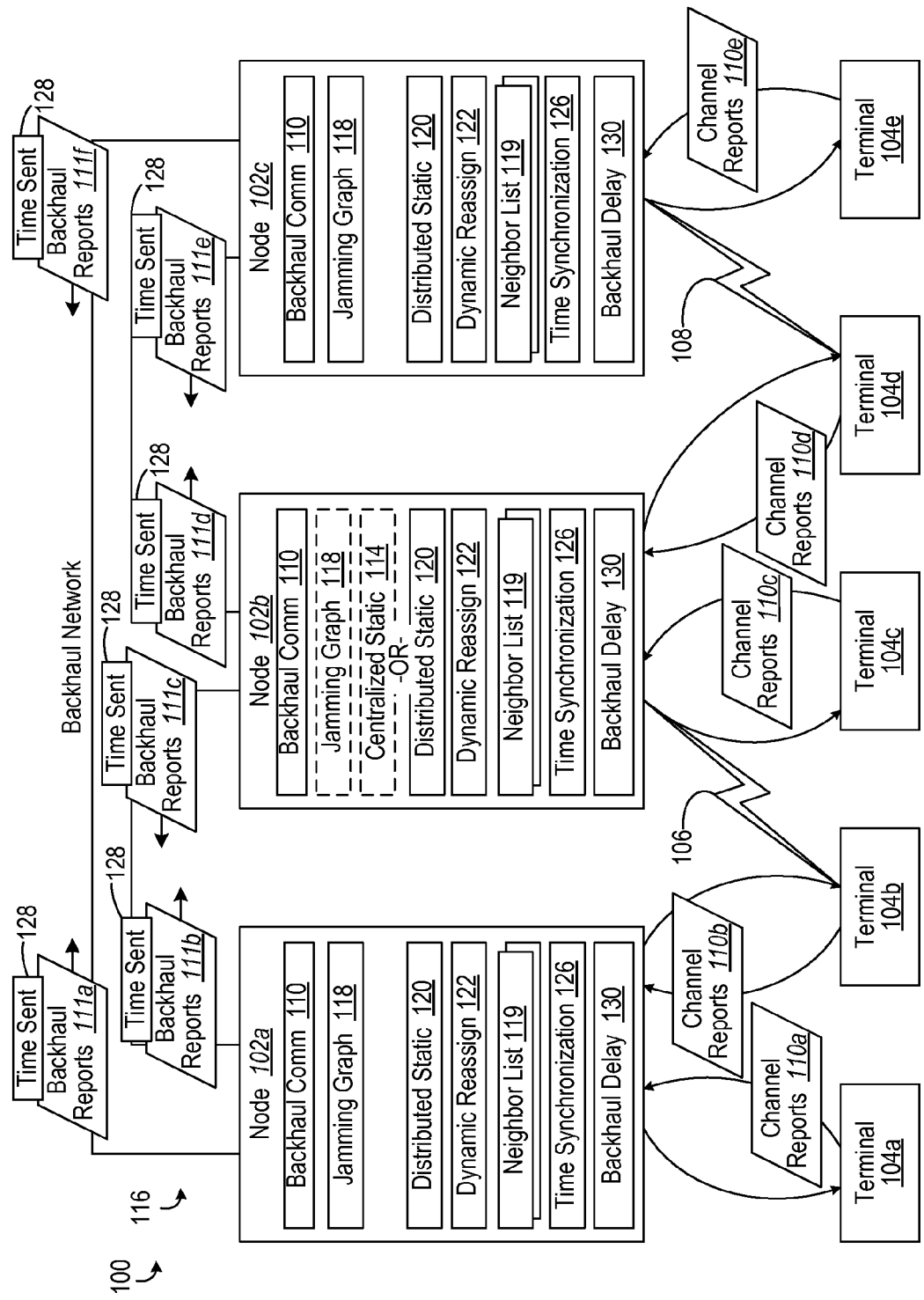
FIG. 1 depicts a block diagram of a wireless communication system in which backhaul communication between nodes is used to allocate resources using a jamming graph.

With reference to FIG. 1, a wireless communication system 100 has nodes 102a-102c serving terminals 104a-104e by using on respective downlinks over-the-air (OTA) resources and scheduling OTA resources on respective uplinks for data packet communication. In some instances, jamming occurs between certain nodes, depicted at 106 for terminal 104a served by node 102b interfered with by node 102b and at 108 for terminal 104d served by node 102b and interfered with by node 102c. The nodes 102a-102c can directly learn of the interference based upon channel terminal reports 110a-110e from terminals 104a-104e or relayed by node backhaul reports 111a-111e.

In one aspect, a node 102b can have sufficient information about the wireless communication system 100 and the jamming 106, 108 for a backhaul communication component 112 to be a designated control node to perform a centralized static algorithm 114. Backhaul signaling (i.e., landline or wireless) from control node 102b on a backhaul network 116 between nodes 102a-102c coordinates assignment of resources to avoid jamming with efficient utilization of resources. In an exemplary aspect, the control node 102b uses a jamming graph 118 as a convenient tool for systematically approaching the static allocation of resources. In particular, the backhaul communication component 112 uses a jamming graph 118 as a tool based upon backhaul reports 111a-111f from neighboring nodes 102a-102c for static resource assignment that avoids severe interference between nodes 102a-102c and achieves high resource reuse.

Alternatively, each node 102a-102c can comprise a backhaul communication component 112 that uses limited knowledge of the wireless communication system 100 to perform a distributed static algorithm 120. Results of distributed static negotiation changes assignment of resources. Thus, none of the nodes 102a-102c acts as control node. Moreover, each node 102a-102c can either have an incomplete jamming graph 118 or use rules based upon neighbor lists 119, developed through discovery or received over the backhaul network 116.

Alternatively or in addition to either centralized or distributed static resource allocation, a dynamic resource negotiation algorithm can be used to achieve more dynamic reuse of the resource to improve the user experience. The baseline (static) assignment of resources thus can be achieved through centralized static allocation, distributed static allocation, or by another means such as just ad hoc use of resources. For example, bursty use of resources can provide a reason for temporarily granting use of resources statically assigned to a node 102a-102c. To that end, the backhaul communication component 112 of each node 102a-102c can respond to changes in the wireless communication system 100, such as nodes added, nodes dropped, changes in traffic pattern, etc. Resource reassignment rules 122 inform each node 102a-102c about when it is appropriate to request resources or to grant resources to neighboring nodes in a dynamic fashion wherein statically assigned jamming graph resource remain unchanged for the long term. Exchange of neighbor lists 124 can assist in determining which nodes 102a-102c would be affected by a resource grant. Time synchronization component 126 of each node 102a-102c facilitates time stamping 128 of backhaul reports or messages 111a-111f sent via backhaul network 116 can be used to determine efficient resource allocation by estimating backhaul delay by component 130.

Figure 2:
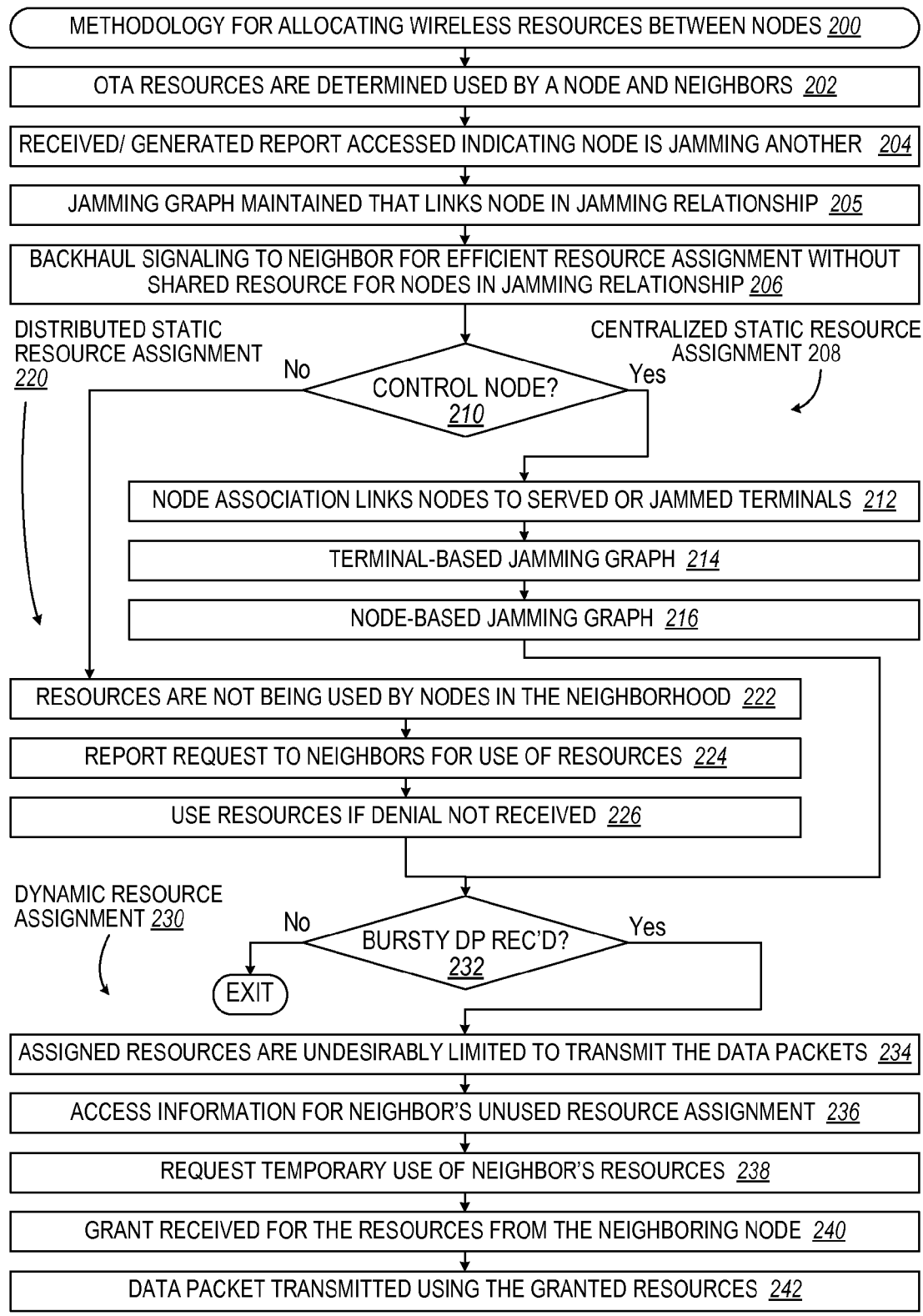
FIG. 2 depicts a flow diagram of a methodology or sequence of operations for using backhaul communication between nodes is used to allocate resources using a jamming graph.

In FIG. 2, a methodology or sequence of operations 200 is provided for allocating wireless resources between nodes by employing a processor executing computer executable instructions stored on a computer readable storage medium to implement the following acts: Over-the-air resources are determined used by a node and used by neighboring nodes of a neighborhood (block 202). A report is accessed, either received or generated by the node, indicating that a selected node is jamming another node in the neighborhood (block 204). A jamming graph is maintained that links nodes in the neighborhood based upon a jamming relationship between respective pairs of nodes (block 205). Backhaul signaling to a neighboring node assigns resources for efficient resource use without shared resource use between a pair of nodes in a jamming relationship (block 206).

In one aspect, centralized static resource assignment is appropriate as depicted at 208. To that end, a determination is made whether a control node has sufficient knowledge of the communication network to perform central assignment of resources based upon a node-based jamming graph that links pairs of nodes that serve or jam the same terminal (block 210). If so, a node association is determined that links terminals to a respective node that serves each terminal and links any terminal to a node that causes jamming (block 212). A terminal-based jamming graph is determined that link pairs of terminals that can receive the same node either in a serving capacity or a jamming capacity (block 214). A node based jamming graph is determined that links pairs of nodes that serve or jam the same terminal. Resources are assigned for a jamming-free condition wherein a given resource is not assigned to connected nodes in a jamming graph (block 216).

In another aspect, distributed resource assignment is appropriate wherein each node negotiates grants of owned resources with other nodes in the neighborhood in response to a change in the neighborhood as depicted at 220, such as if the determination in block 210 is that a node has not been designed as control node. To that end, a determination is made that resources are not being used by any nodes in the neighborhood (block 222). A request is reported to the nodes in the neighborhood to use the resources (block 224). Data packets are transmitted using the requested resources in response to not receiving any denials of the use (block 226).

In an additional aspect, a dynamic use of assigned resources can address short-term bursty transmission requirements without changing the static assignment, as depicted at 230. To that end, receiving a data packet for transmission at a first node in communication with a neighboring node of a network neighborhood (block 232). A determination is made that assigned resources are undesirably limited to transmit the data packets (block 234). Information is accessed for statically-assigned over-the-air resources not being used by the neighboring node (block 236). A temporary grant is requested for the resources from the neighboring node (block 238). A grant is received for the resources from the neighboring node (block 240). The data packet is transmitted using the granted resources (block 242).

Figure 3:
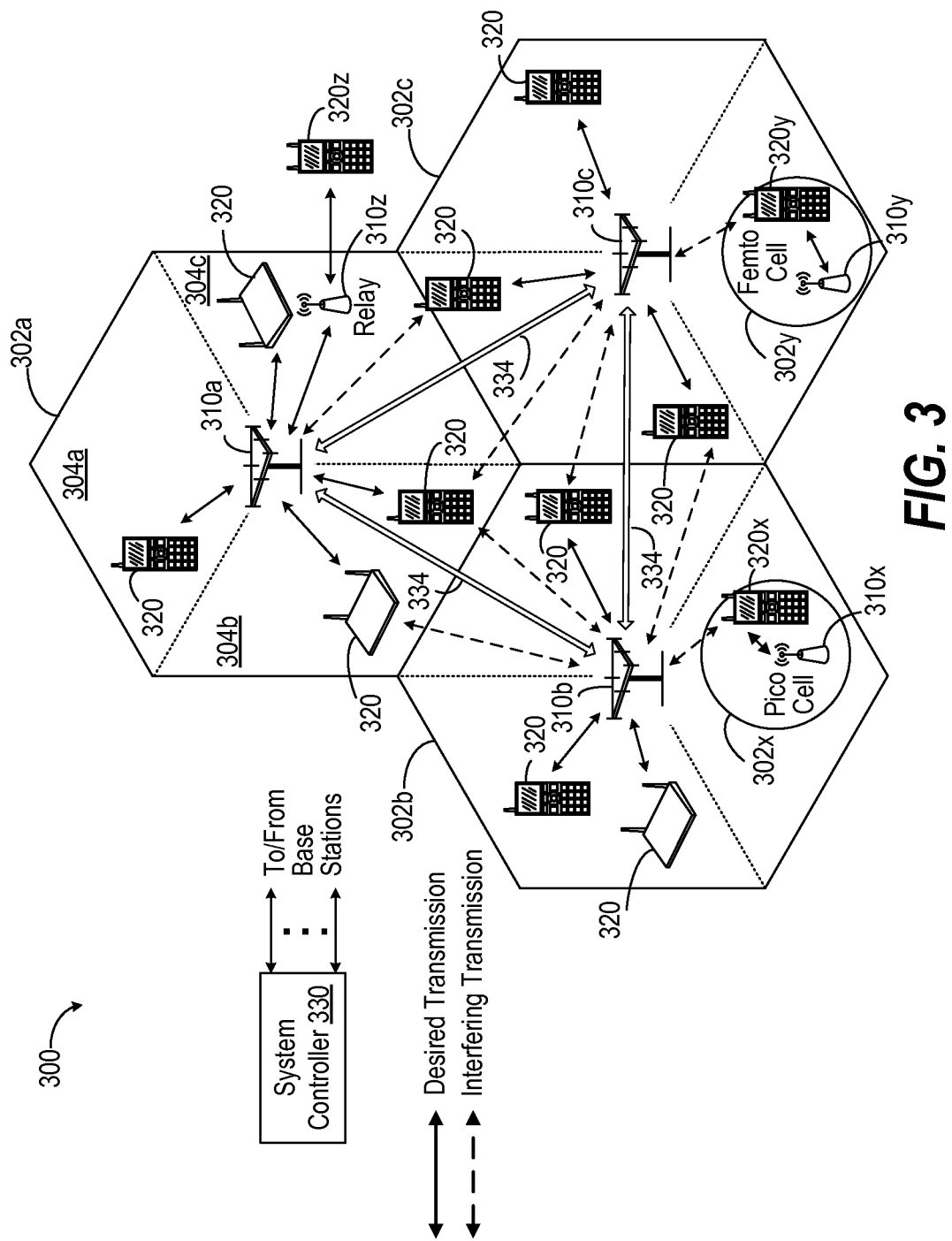
FIG. 3 depicts a block diagram of base stations serving and interfering with a population of terminals.

In the example shown in FIG. 3, base stations 310a, 310b and 310c may be macro base stations for macro cells 302a, 302b and 302c, respectively. Base station 310x may be a pico base station for a pico cell 302x communicating with terminal 320x. Base station 310y may be a femto base station for a femto cell 302y communicating with terminal 320y. Although not shown in FIG. 3 for simplicity, the macro cells may overlap at the edges. The pico and femto cells may be located within the macro cells (as shown in FIG. 3) or may overlap with macro cells and/or other cells.

Wireless network 300 may also include relay stations, e.g., a relay station 310z that communicates with terminal 320z. A relay station is a station that receives a transmission of data and/or other information from an upstream station and sends a transmission of the data and/or other information to a downstream station. The upstream station may be a base station, another relay station, or a terminal. The downstream station may be a terminal, another relay station, or a base station. A relay station may also be a terminal that relays transmissions for other terminals. A relay station may transmit and/or receive low reuse preambles. For example, a relay station may transmit a low reuse preamble in similar manner as a pico base station and may receive low reuse preambles in similar manner as a terminal.

A network controller 330 may couple to a set of base stations and provide coordination and control for these base stations. Network controller 330 may be a single network entity or a collection of network entities. Network controller 330 may communicate with base stations 310 via a backhaul. Backhaul network communication 334 can facilitate point-to-point communication between base stations 310a-310c employing such a distributed architecture. Base stations 310a-310c may also communicate with one another, e.g., directly or indirectly via wireless or wireline backhaul.

Wireless network 300 may be a homogeneous network that includes only macro base stations (not shown in FIG. 3). Wireless network 300 may also be a heterogeneous network that includes base stations of different types, e.g., macro base stations, pico base stations, home base stations, relay stations, etc. These different types of base stations may have different transmit power levels, different coverage areas, and different impact on interference in wireless network 300. For example, macro base stations may have a high transmit power level (e.g., 20 Watts) whereas pico and femto base stations may have a low transmit power level (e.g., 3 Watt). The techniques described herein may be used for homogeneous and heterogeneous networks.

Terminals 320 may be dispersed throughout wireless network 300, and each terminal may be stationary or mobile. A terminal may also be referred to as an access terminal (AT), a mobile station (MS), user equipment (UE), a subscriber unit, a station, etc. A terminal may be a cellular phone, a personal digital assistant (PDA), a wireless modem, a wireless communication device, a handheld device, a laptop computer, a cordless phone, a wireless local loop (WLL) station, etc. A terminal may communicate with a base station via the downlink and uplink. The downlink (or forward link) refers to the communication link from the base station to the terminal, and the uplink (or reverse link) refers to the communication link from the terminal to the base station.

A terminal may be able to communicate with macro base stations, pico base stations, femto base stations, and/or other types of base stations. In FIG. 3, a solid line with double arrows indicates desired transmissions between a terminal and a serving base station, which is a base station designated to serve the terminal on the downlink and/or uplink. A dashed line with double arrows indicates interfering transmissions between a terminal and a base station. An interfering base station is a base station causing interference to a terminal on the downlink and/or observing interference from the terminal on the uplink.

Wireless network 300 may support synchronous or asynchronous operation. For synchronous operation, the base stations may have the same frame timing, and transmissions from different base stations may be aligned in time. For asynchronous operation, the base stations may have different frame timing, and transmissions from different base stations may not be aligned in time. Asynchronous operation may be more common for pico and femto base stations, which may be deployed indoors and may not have access to a synchronizing source such as Global Positioning System (GPS).

In one aspect, to improve system capacity, the coverage area 302a, 302b, or 302c corresponding to a respective base station 310a-310c can be partitioned into multiple smaller areas (e.g., areas 304a, 304b, and 304c). Each of the smaller areas 304a, 304b, and 304c can be served by a respective base transceiver subsystem (BTS, not shown). As used herein and generally in the art, the term "sector" can refer to a BTS and/or its coverage area depending on the context in which the term is used. In one example, sectors 304a, 304b, 304c in a cell 302a, 302b, 302c can be formed by groups of antennas (not shown) at base station 310, where each group of antennas is responsible for communication with terminals 320 in a portion of the cell 302a, 302b, or 302c. For example, a base station 310 serving cell 302a can have a first antenna group corresponding to sector 304a, a second antenna group corresponding to sector 304b, and a third antenna group corresponding to sector 304c. However, it should be appreciated that the various aspects disclosed herein can be used in a system having sectorized and/or unsectorized cells. Further, it should be appreciated that all suitable wireless communication networks having any number of sectorized and/or unsectorized cells are intended to fall within the scope of the hereto appended claims. For simplicity, the term "base station" as used herein can refer both to a station that serves a sector as well as a station that serves a cell. It should be appreciated that as used herein, a downlink sector in a disjoint link scenario is a neighbor sector. While the following description generally relates to a system in which each terminal communicates with one serving access point for simplicity, it should be appreciated that terminals can communicate with any number of serving access points.

Figure 4:
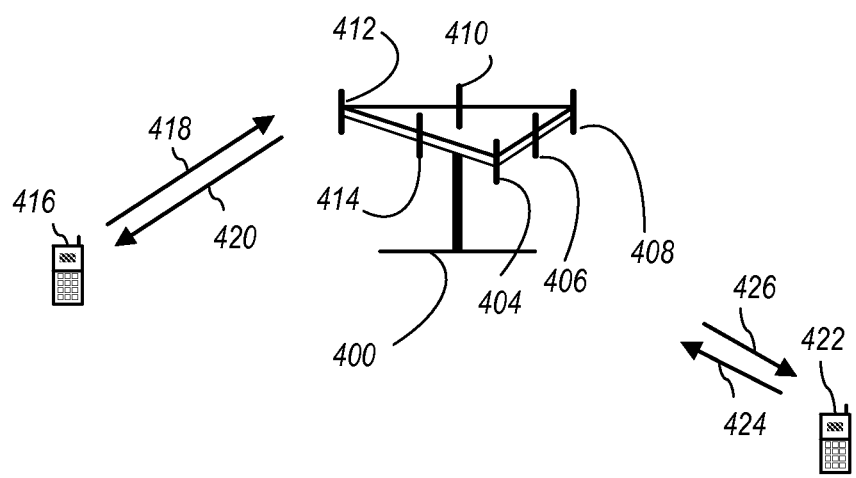
FIG. 4 depicts a block diagram of a multiple access wireless communication system.

Referring to FIG. 4, a multiple access wireless communication system according to one embodiment is illustrated. An access point (AP) 400 includes multiple antenna groups, one including 404 and 406, another including 408 and 410, and an additional including 412 and 414. In FIG. 4, only two antennas are shown for each antenna group, however, more or fewer antennas may be utilized for each antenna group. Access terminal (AT) 416 is in communication with antennas 412 and 414, where antennas 412 and 414 transmit information to access terminal 416 over forward link 420 and receive information from access terminal 416 over reverse link 418. Access terminal 422 is in communication with antennas 406 and 408, where antennas 406 and 408 transmit information to access terminal 422 over forward link 426 and receive information from access terminal 422 over reverse link 424. In a FDD system, communication links 418, 420, 424 and 426 may use different frequency for communication. For example, forward link 420 may use a different frequency then that used by reverse link 418.

Each group of antennas and/or the area in which they are designed to communicate is often referred to as a sector of the access point. In the aspect, antenna groups each are designed to communicate to access terminals in a sector, of the areas covered by access point 400.

In communication over forward links 420 and 426, the transmitting antennas of access point 400 utilize beamforming in order to improve the signal-to-noise ratio of forward links for the different access terminals 416 and 422. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as an access point, a Node B, or some other terminology. An access terminal may also be called an access terminal, user equipment (UE), a wireless communication device, terminal, access terminal or some other terminology.

Figure 5:
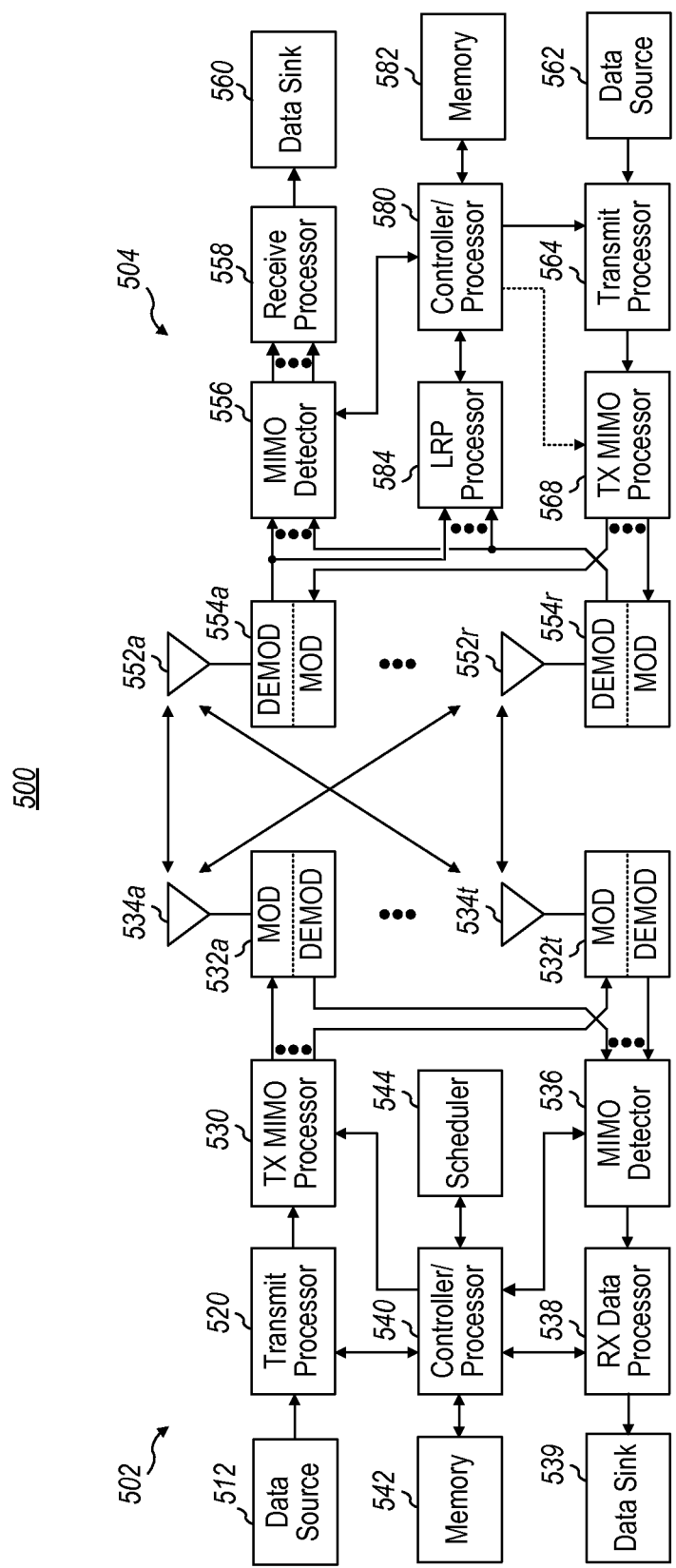
FIG. 5 depicts a block diagram of a communication system between a base station and a terminal.

FIG. 5 shows a block diagram of a design of a communication system 500 between a base station 502 and a terminal 504, which may be one of the base stations and one of the terminals in FIG. 1. Base station 502 may be equipped with TX antennas 534a through 534t, and terminal 504 may be equipped with RX antennas 552a through 552r, where in general T≥1 and R≥1.

At base station 502, a transmit processor 520 may receive traffic data from a data source 512 and messages from a controller/processor 540. Transmit processor 520 may process (e.g., encode, interleave, and modulate) the traffic data and messages and provide data symbols and control symbols, respectively. Transmit processor 520 may also generate pilot symbols and data symbols for a low reuse preamble and pilot symbols for other pilots and/or reference signals. A transmit (TX) multiple-input multiple-output (MIMO) processor 530 may perform spatial processing (e.g., preceding) on the data symbols, the control symbols, and/or the pilot symbols, if applicable, and may provide T output symbol streams to T modulators (MODs) 532a through 532t. Each modulator 532 may process a respective output symbol stream (e.g., for OFDM, SC-FDM, etc.) to obtain an output sample stream. Each modulator 532 may further process (e.g., convert to analog, amplify, filter, and upconvert) the output sample stream to obtain a downlink signal. T downlink signals from modulators 532a through 532t may be transmitted via T antennas 534a through 534t, respectively.

At terminal 504, antennas 552a through 552r may receive the downlink signals from base station 502 and may provide received signals to demodulators (DEMODs) 554a through 554r, respectively. Each demodulator 554 may condition (e.g., filter, amplify, downconvert, and digitize) a respective received signal to obtain input samples. Each demodulator 554 may further process the input samples (e.g., for OFDM, SC-FDM, etc.) to obtain received symbols. A MIMO detector 556 may obtain received symbols from all R demodulators 554a through 554r, perform MIMO detection on the received symbols if applicable, and provide detected symbols. A receive processor 558 may process (e.g., demodulate, deinterleave, and decode) the detected symbols, provide decoded traffic data for terminal 504 to a data sink 560, and provide decoded messages to a controller/processor 580. A low reuse preamble (LRP) processor 584 may detect for low reuse preambles from base stations and provide information for detected base stations or cells to controller/processor 580.

On the uplink, at terminal 504, a transmit processor 564 may receive and process traffic data from a data source 562 and messages from controller/processor 580. The symbols from transmit processor 564 may be precoded by a TX MIMO processor 568 if applicable, further processed by modulators 554a through 554r, and transmitted to base station 502. At base station 502, the uplink signals from terminal 504 may be received by antennas 534, processed by demodulators 532, detected by a MIMO detector 536 if applicable, and further processed by a receive data processor 538 to obtain the decoded packets and messages transmitted by terminal 504 for providing to a data sink 539.

Controllers/processors 540 and 580 may direct the operation at base station 502 and terminal 504, respectively. Processor 540 and/or other processors and modules at base station 502 may perform or direct processes for the techniques described herein. Processor 584 and/or other processors and modules at terminal 504 may perform or direct processes for the techniques described herein. Memories 542 and 582 may store data and program codes for base station 502 and terminal 504, respectively. A scheduler 544 may schedule terminals for data transmission on the downlink and/or uplink and may provide resource grants for the scheduled terminals.

Figure 6:
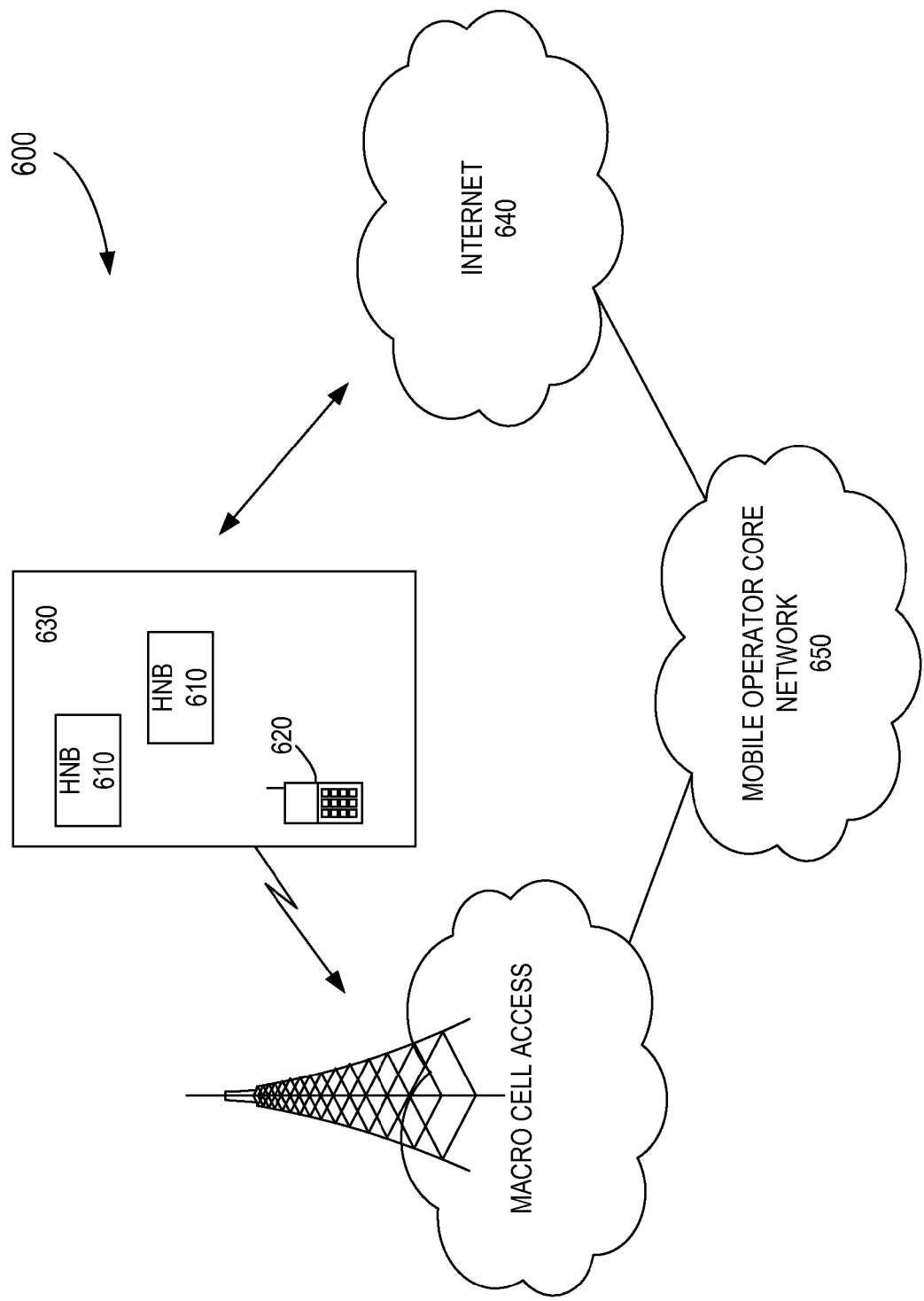
FIG. 6 depicts a block diagram of a communication system to enable deployment of access point base stations within a network environment.

FIG. 6 illustrates an exemplary communication system to enable deployment of access point base stations within a network environment. As shown in FIG. 6, the system 600 includes multiple access point base stations or Home Node B units (HNBs), such as, for example, HNBs 610, each being installed in a corresponding small scale network environment, such as, for example, in one or more user residences 630, and being configured to serve associated, as well as alien, user equipment (UE) 620. Each HNB 610 is further coupled to the Internet 640 and a mobile operator core network 650 via a DSL router (not shown) or, alternatively, a cable modem (not shown), a wireless link, or other Internet connectivity means.

Although embodiments described herein use 3GPP terminology, it is to be understood that the embodiments may be applied to 3GPP (Rel99, Rel5, Rel6, Rel7) technology, as well as 3GPP2 (1xRTT, 1xEV-DO Rel0, RevA, RevB) technology and other known and related technologies. In such embodiments described herein, the owner of the HNB 610 subscribes to mobile service, such as, for example, 3G mobile service, offered through the mobile operator core network 650, and the UE 620 is capable to operate both in macro cellular environment and in residential small scale network environment.

JAMMING GRAPH. Jamming graph is used to visualize the interference relationship between nodes in a network. The information needed to form a jamming graph may be collected from the PilotStrength report from ATs or measured through some other mechanisms.

For forward link case, the PilotStrength report contains the information such as which sector is serving sector and the signal strength from serving sector and other interfering sectors. For reverse link case, we are actually interested in the pathloss from the serving sector and the interfering sectors. However, if the transmit power of each sector is known or can be found out through backhaul messaging, the pathloss information can be derived from pilot strength information. Therefore, it is fair to say, the PilotStrength report can be used for both forward link and reverse link jamming scenario study.

Figure 7:
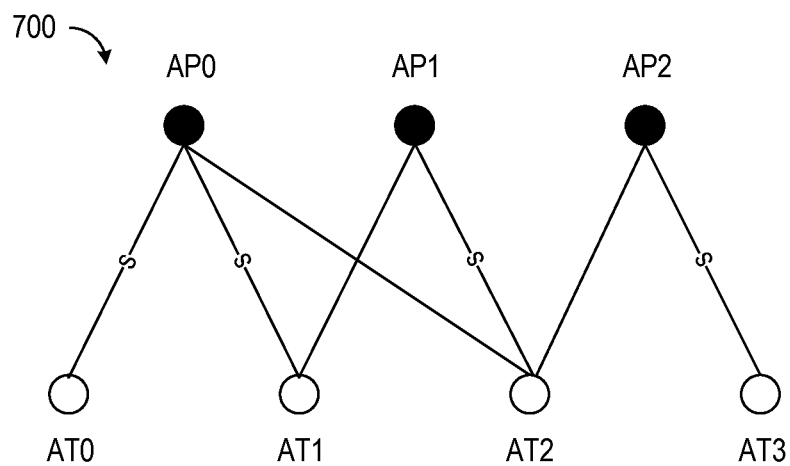
FIG. 7 depicts a diagram of a node association graph.

Given all PilotStrength reports from all ATs, we can form a node association graph 700 as depicted in FIG. 7. The node association graph is a bipartite graph with all AP nodes on one side and all AT nodes on the other side. An AP node is connected to an AT node if and only if the AP appears in the AT's PilotStrength report as serving AP or dominant interferer AP. FIG. 1D shows an example of a node association graph. For each AT, we would like to keep the information on which AP is the serving AP. In order to achieve this, we label the edges in the node association graph by "s" if the AP is a serving AP for the AT. Note that there is one and only one serving edge leaving each AT node.

There are two types of jamming graphs we are interested in, AP-based jamming graph and AT-based jamming graph.

Figure 8:
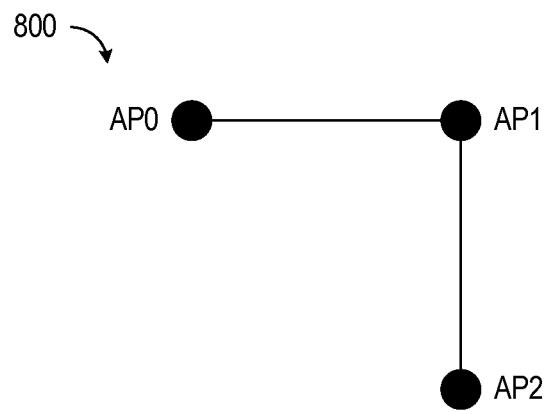
FIG. 8 depicts a diagram of an access point (AP)-based jamming graph based upon the node association graph of FIG. 7.

An AP-based jamming graph can be generated from a node association graph. In the AP-based jamming graph, each node is an AP. Two AP nodes are connected if and only if they are connected by at least one AT node in the corresponding node association graph, and one of the two edges in the path is a serving edge. This implies that one of the AP is the serving AP of the AT and the other AP is a dominant interferer. The AP-based jamming graph corresponds to the node association graph in FIG. 7 is shown in FIG. 8 at 800.

Given a node association graph, we can also generate an AT-based jamming graph. In the AT-based jamming graph, each node is an AT. Two nodes are connected if these two ATs are connected by at least one AP node in the corresponding node association graph, and in the two edges in the path, at least one of them is serving edge. If only one edge is serving edge, this is the case serving one AT (the one connected to the serving edge) will interfere with the other AT. If both edges are serving edges, this is actually not a jamming scenario, as these two ATs are served by the same AP. Since we do not consider techniques such as superposition coding, these two ATs need to be served on orthogonal resources in time/frequency/code/spatial domain.

Figure 9:
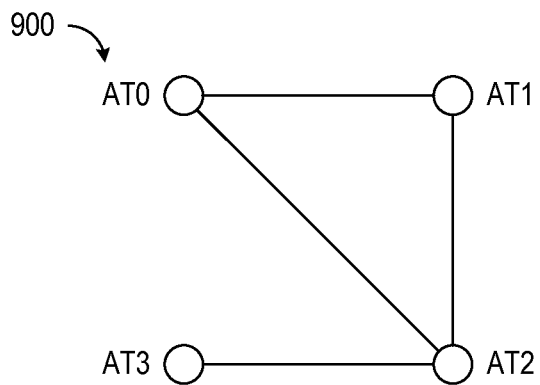
FIG. 9 depicts a diagram of an access terminal (AT)-based jamming graph based upon the node association graph of FIG. 7.

The AT-based jamming graph corresponds to the node association graph in FIG. 7 is shown in FIG. 9 at 900.

Figure 10:
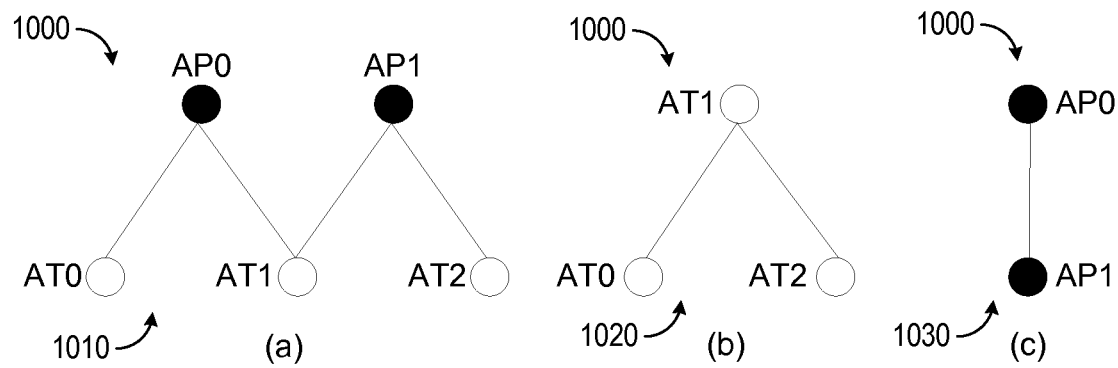
FIG. 10 depicts a diagram of network having three ATs and 2 APs.

Now we have two types of jamming graphs. Which of them we can use depends on whether we can coordinate scheduling between APs. In FIG. 10, a network 1000 having three ATs and two APs is depicted. A node association graph at 1010 depicts AP0 linked to AT0 and AT1 and AP1 linked to AT1 and AT2. An AT-based jamming graph at 1020 depicts AT1 linked both to AT0 and to AT2. An AP-based jamming graph at 1030 depicts AP0 linked to AP1. This depictions illustration an assumption that AT0 and AT1 are served by AP0 and AT2 is served by AP1. When AP0 and AP1 cannot coordinate their scheduling, they cannot share the same resource (transmit over the same time/frequency/code/spatial resource). For example, the transmission from AP1 to AT2 will jam the transmission from AP0 to AT1 (if AT1 is scheduled). In this case, we only need AP-based jamming graph 1030 and we can assign different resources to AP0 and AP1. On the other hand, when APs can coordinate their scheduling, AT-based jamming graph 1020 is advantageous for it contains more information. In this case we can assign the same resource to AT0 and AT2 and assign another resource to AT1.

Figure 10A:
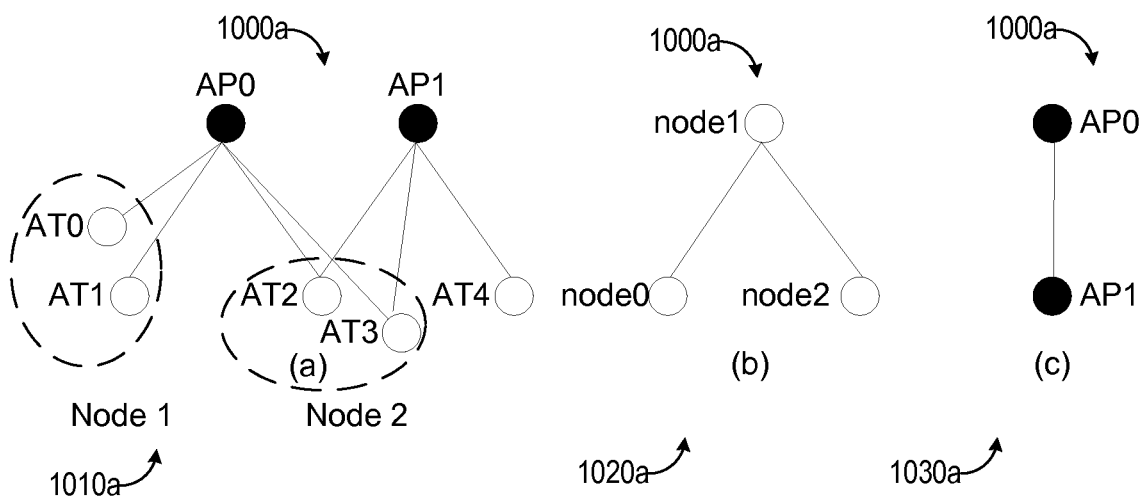
FIG. 10A depicts a diagram having nodes comprises of multiple terminals.

In FIG. 10A, a similar network 1000a is depicted rendered as a node association graph at 1010a, an AT-based jamming graph at 1020a, and an AP-based jamming graph at 1030a. It should be appreciated with the benefit of the present disclosure that as a general concept that a node is not necessarily a physical node, but rather a collection of links that have a similar interference profile. In addition, "backhaul" negotiation in some instances can between neighboring nodes could be within a single access point (AP). Further, a cluster of APs could be within a single node, such as when the cluster of APs jointly serve a plurality of user equipment (UEs) without orthogonalized resources. These variations are depicted as Node 1 containing AT0 and AT1 and as Node 2 containing AT2 and AT3.

For a large system, the number of ATs can be very large. In this case, the size of the AT-based jamming graph can be too large to handle. However, there is an easy way to reduce the size of the graph by merging nodes. Namely, for a set of AT nodes, if they have the same set of AP neighbor nodes in the node association graph, they can be merged into a single AT node; the resource assignment algorithm can treat this merged node as a normal AT node. The merged AT node can be interpreted as a collection of ATs. Between the ATs in the merged AT node, the resource usage needs to be orthogonalized. Even if some ATs do not have exactly the same set of AP neighbors in the node association graph, they can still be merged, as long as the difference of their AP neighbor set is small. For the merged AT node, the AP neighbor set will be the union of all AP neighbor sets of the individual ATs. Some level resource waste may be introduced in this merging process as some association information is lost. However, it may help to reduce the complexity of the resulting jamming graph and improve the efficiency of the resource negotiation algorithm.

If two AP nodes 1004a-1004b are connected in an AP-based jamming graph 1030, it means they are very close, and is very likely to be the dominant interference to the AT served by the other AP. Therefore, we would like to assign orthogonal resources to these two APs 1004a-1004b to improve SINR for each of them.

If two AT nodes are connected in an AT-based jamming graph, it means that either these two ATs are served by the same AP, so they cannot be scheduled over the same resource, or one of the AT will be severely interference by the transmission from an AP to the other AT, and it cannot be scheduled at the same time.

These two observations can be summarized in the jamming-free condition: A given resource assignment is jamming-free if the same resource is not assigned to connected nodes in a jamming graph. This condition can be applied in resource assignment design.

STATIC RESOURCE ASSIGNMENT. In this section, we will only use AP-based jamming graphs.

For the network to be stable, it can be advantageous to have a distributed network, i.e., do not rely on a central scheduler or central resource manager. It is also advantageous for an AP to have some resource on hand to be able to handle some traffic without relying on slow backhaul process to request resources. Therefore, in our baseline design, we assign static resources to each node, and let nodes negotiate about more flexible reuse.

CENTRALIZED STATIC RESOURCE ASSIGNMENT. The straight-forward way to solve the static resource assignment problem is to use a centralized algorithm, which is aware of the entire jamming graph.

For static resource assignment, there are a few problems we want to solve:

First, what are the valid ways to assign a resource to APs. This is equivalent to the problem of finding set of nodes in the AP-based jamming graph such that none of them are connected to each other.

Second, given all resources, how to apply different assignment patterns to each of them such that the static resource assignment in the network achieves some property. For example, from a fairness point of view, it might be good for each node to have approximately the same amount of resources.

Figure 11:
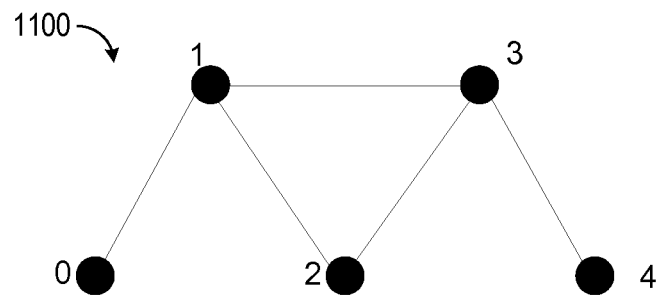
FIG. 11 depicts a process using AP-based jamming graphs to determine resource allocation patterns.

For clarity, consider a demonstration of the process in FIG. 11, depicting an AP-based jamming graph 1100 with five (5) nodes 1001a-1001e. Node 1 1001b is linked to Node 0 1001a, Node 2 1001c, and Node 3 1001d, the latter being alone linked to Node 4 1001e. Following the jamming-free condition, we would like to know all the patterns that a resource can be assigned. For example, we can use the same resource on Nodes 0, 2, 4 1001a, 1001c, 1001e. A natural question is how to enumerate all the combinations. If there are N nodes in the system, the brute force enumeration has the complexity $2^N$, which might be too large to implement for a large N. In an illustrative aspect, here we provide a graph-based algorithm.

Figure 12:
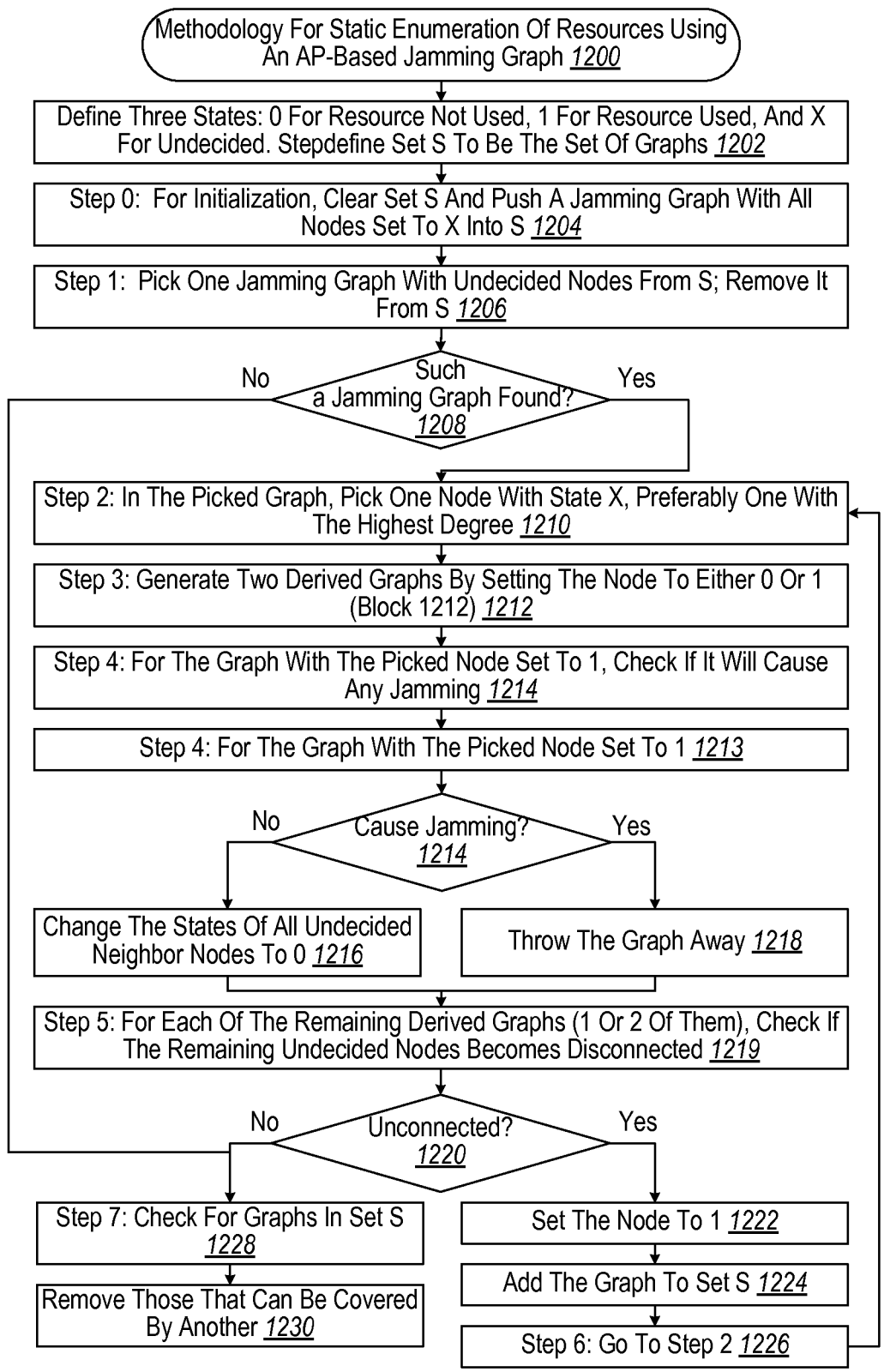
FIG. 12 depicts a flow diagram of a methodology or sequence of operations for enumerating resources using AP-based jamming graph.

In FIG. 12, a methodology or sequence of operations 1200 for enumeration of resources using an AP-based jamming graph. As a notation aid, for each node we define three states: 0 for resource not used, 1 for resource used, and X for undecided. Define set S to be the set of graphs (block 1202). Step 0: For initialization, clear set S and push a jamming graph with all nodes set to X into S (block 1204). Step 1: Pick one jamming graph with undecided nodes from S; Remove it from S (block 1206). If no such jamming graph can be found, go to Step 7 (block 1208). Step 2: In the picked graph, pick one node with state X, which can advantageously be one with the highest degree (block 1210). Step 3: Generate two derived graphs by setting the node to either 0 or 1 (block 1212). Step 4: For the graph with the picked node set to 1 (block 1213), check if it will cause any jamming (block 1214); If no, change the states of all undecided neighbor nodes to 0 (block 1216). Otherwise, throw the graph away (block 1218). Step 5: For each of the remaining derived graphs (1 or 2 of them) (block 1219), check if a remaining undecided node becomes disconnected (the undecided node is not directly connected to another undecided node) (block 1220). If yes, set the node to 1 as well (block 1222). Add the graph to set S (block 1224). Step 6: Go to Step 2 (block 1226). Step 7: Check for graphs in set S (block 1228). Remove those that can be covered by another. (All state 1 nodes in the graph from a subset of all state 1 nodes in another graph) (block 1230).

Figure 13:
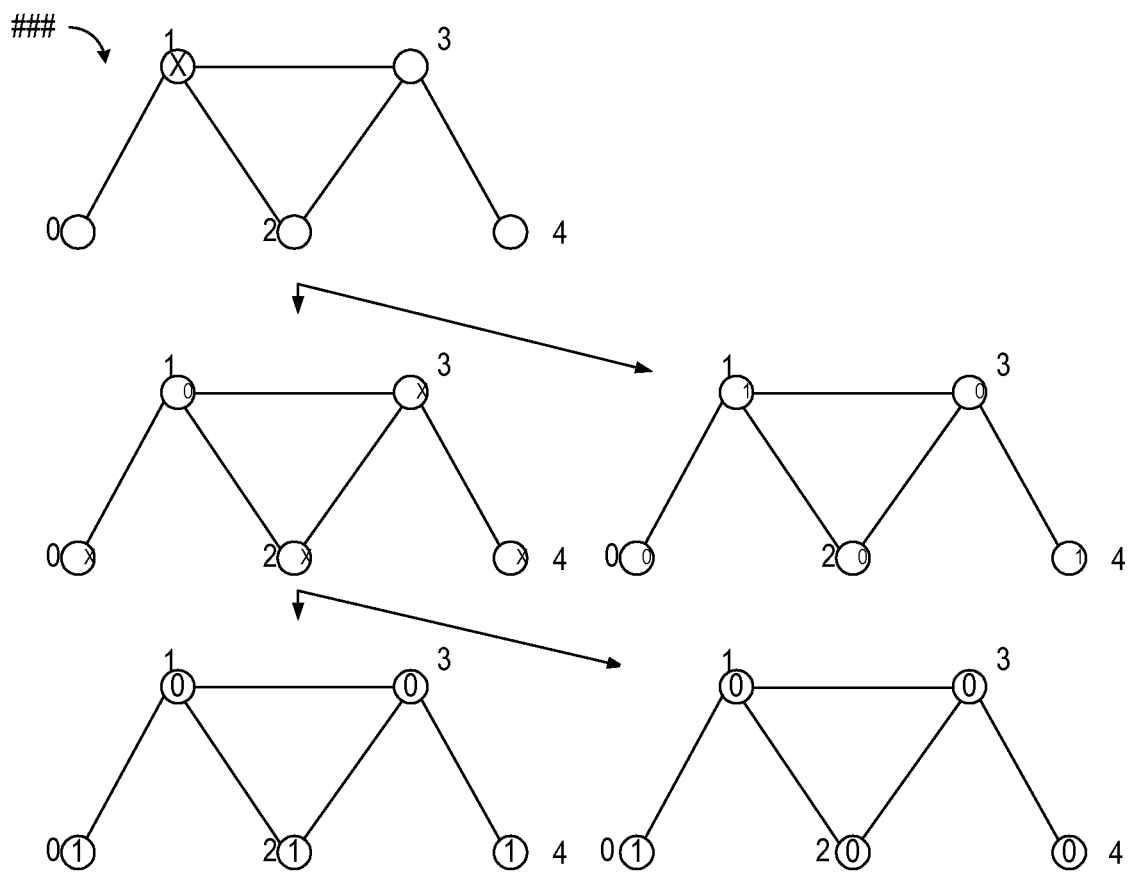
FIG. 13 depicts a diagram for a process of static resource assignment pattern search.

Applying this algorithm to the example in FIG. 11, we have the following process 1300 shown in FIG. 13 as an example of static resource assignment pattern search. The first line is the initial graph 1302, with all nodes 1304a-1304e set to state X. For the first round of the algorithm, we pick this initial graph. We can set node 1 1304b to 0 or 1. When we set it to 0 as depicted at 1306, all other nodes 1304a, 1304c-1304e are still undecided, and we put the graph back in set S. When we set it to 1 as depicted at 1308, all neighbors (nodes 0, 2, and 3 1304a, 1304c-1304d) are set to 0. Node 4 1304e becomes a disconnect node, and we set it to 1 as well. (Note that this graph 1308 has no undecided nodes any more). We still put it back to set S. For the second round of the algorithm, there is only one graph with undecided nodes in set S, the first one on the second row as depicted at 1306. We pick node 3 1304d of the graph as depicted at 1310 and try to set it to 0 or 1. If we set the state to 0, the remaining undecided nodes (0, 2, and 4 1304a, 1304c, 1304e) all become disconnected, and we can set them all to 1. This becomes the first graph in the third row as depicted at 1312. If we set the state to 1 as depicted at 1314, we also need to set nodes 2 and 4 to 0. Then node 0 becomes disconnected and we set it to 1. After this round, there is no undecided node in all jamming graphs in set S anymore. The algorithm terminated, and we have three resource assignment patterns in set S. It happens that they cannot be further condensed in this example.

We can summarize the resulting resource assignment pattern in vector form. In the previous example, we have three resource assignment vectors [0,1,0,0,1], [1,0,1,0,1], and [1,0,0,1,0], where the $i^{th}$ entry represents the usage in node i. A given resource can be assigned to all nodes correspond to 1's in the vector without causing any jamming.

The next problem to solve is how to decide on how many resources are used with each pattern.

The problem can be modeled as follows: Assume we have N nodes and M resource assignment patterns. Define an N×M matrix P such that each column is a resource assignment pattern. Define M×1 vector a where $a_i$ is the ratio of resources assigned to the $i^{th}$ resource assignment pattern. Note that $a_i$ is always non-negative by definition. In most cases, we have further constraints on the selection of $a_i$, such as, the granularity of the resource assignment is limited. Define N×1 vector w=P×a. Then $w_i$ is the ratio of resource available at node i. The average reuse factor of the system is $$\frac{1}{N}\sum_{i=0}^{N-1} w_i.$$

Different optimization criterion can be selected. Some examples are:

We can pick a such that the resulting w has maximum $$\frac{1}{N}\sum_{i=0}^{N-1} w_i,$$

i.e., the average reuse factor is maximized. If a does not have any granularity issue, this is a well-posed linear programming problem and can be easily solved. If the granularity constraint applies, this becomes integer programming and is in general hard.

We can pick a such that the resulting w, after normalized, has the closest match to a given vector u. Under this criterion, we can target equal resource assignment between APs, or let the resource assignment proportional to the number of active ATs in each AP. If the matching is $L_1$ sense, i.e., we want to minimize $$\frac{1}{N} \sum_{i=0}^{N-1} |(w_i - bu_i)|,$$

where b is a positive number to be optimized. If the matching is in $L_2$ sense, i.e., we want to minimize $$\frac{1}{N} \sum_{i=0}^{N-1} (w_i - bu_i)^2.$$

These are non-linear programming and are harder.

In the case that a has granularity constraint, we can still use the non-constraint version to provide a reasonable start point for the integer programming problem.

The solution of this problem can provide a baseline to check how distributed static resource assignment performs.

Still using the example in FIG. 11 and assume totally 8 equal sized resource available. If we want to maximize the average reuse factor, the optimum solution is to assign all the resources to the resource assignment pattern with the highest weight. In this example, we will assign all resources to nodes 0, 2, and 4, and no resource to nodes 1 and 3. The maximum average reuse factor achievable is 0.6. However this is extremely unfair to nodes 1 and 3.

If we use $L_2$ matching to a uniform resource assignment, the optimum solution is assigning 2 resources under pattern [1,0,1,0,1], and assigning 3 resources under patterns [0,1,0, 0,1] and [1,0,0,1,0] respectively. The average reuse is 0.45.

DISTRIBUTED STATIC RESOURCE NEGOTIATION ALGORITHM. Centralize static resource assignment as described in the previous section requires the entire jamming graph to be available at a node. This is difficult when the network is large and the topology of the graph is changing as AT comes and goes. It is advantageous to have a distributed resource assignment algorithm such that the resource assignment decision is made locally with information about the neighbors only based on negotiation between neighbor nodes.

Figure 14:
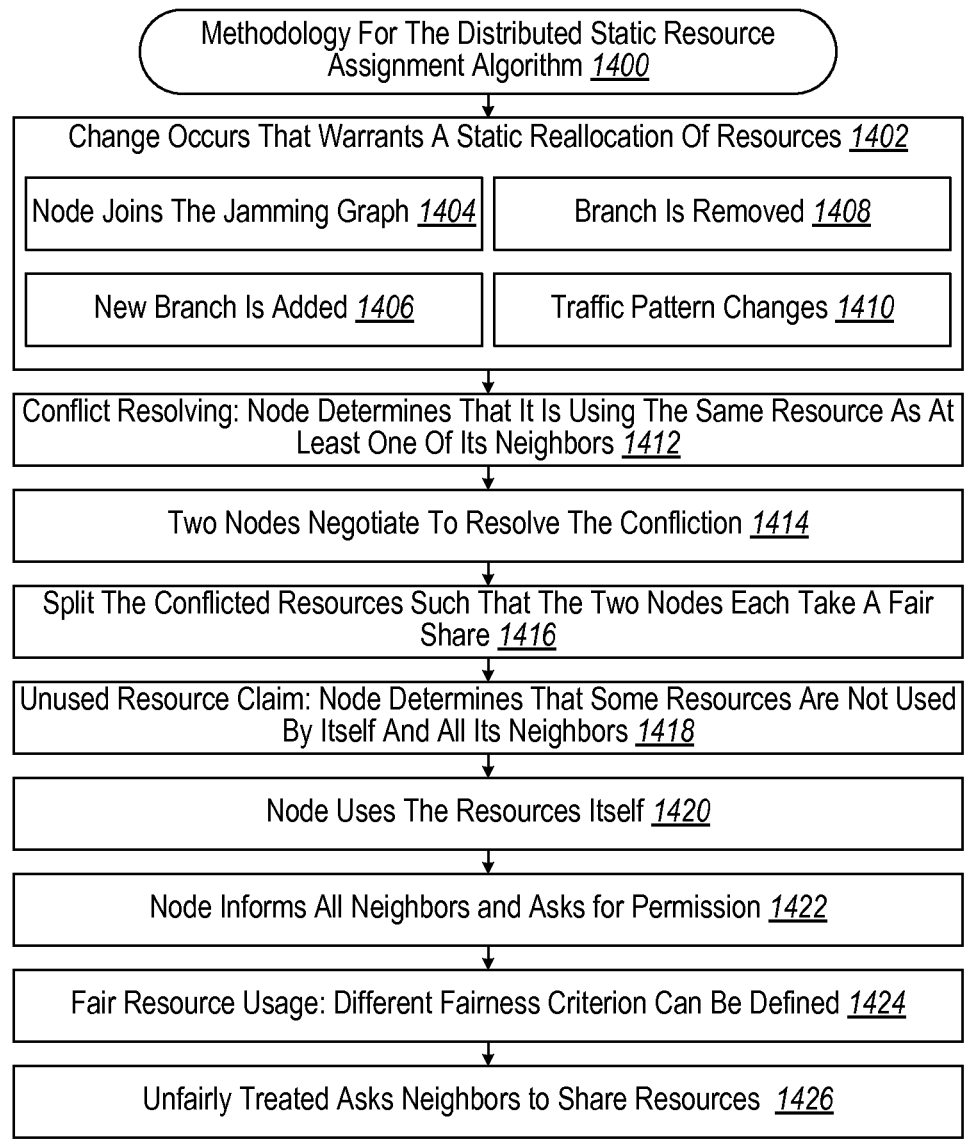
FIG. 14 depicts a flow diagram for a methodology or sequence of operations for distributed resource assignment.

In FIG. 14, a methodology or sequence of operations 1400 is depicted for the distributed static resource assignment algorithm, wherein a processor is employed in each node. The processor can handle many scenarios. In block 1402, a change occurs that warrants a static reallocation of resources. For example, a node joins the jamming graph (block 1404). Both the processor in the newly discovered node and the nodes it is connected to need some action to assign initial static resource to the node. As another example, for the existing nodes, a new branch is added (block 1406). This is usually caused by an AT PilotStrength report with both nodes in it. The processors in involved nodes need to address any resource confliction introduced. As an additional example, a branch is removed (block 1408). An extreme case is a node becomes disconnected. The processors in nodes need to be able to pick up resources whose jamming constraints are released due to the removal of the branch. As a further example, a traffic pattern changes (block 1410). A node notices that its load is normally too high and one neighbor always has free resource. It may like to initiate some static resource re-assignment. Similarly, if a node feels its static resource assignment is "not fair", it can request neighbors to give it some of their resources.

To summarize, nodes can do the following:

Conflict resolving: In block 1412, a node determines that it is using the same resource as at least one of its neighbors. These two nodes need to negotiate to resolve the confliction (block 1414). One possible solution is to split the conflicted resources such that the two nodes each take a fair share (block 1416).

Unused resource claim: In block 1418, a node determines that some resources are not used by itself and all its neighbors. Then it will not cause any confliction if the node uses the resources itself (block 1420). The node has to inform all neighbors about the usage and ask for permission though (block 1422).

Fair resource usage: In block 1424, different fairness criterion can be defined. One simple criterion is just to make the resource assignment as fair as possible between nodes. When a node feels it is unfairly treated, it can ask its neighbors to share some resources with him (block 1426).

All these negotiations can be achieved by the resource request/grant mechanism described in the next section.

IMPLEMENTATION OF THE DISTRIBUTED RESOURCE NEGOTIATION ALGORITHM. Basically, the algorithm in the processor is event driven, and the resource negotiation is based on messages between neighbor nodes. TABLE 1 lists the messages used in the distributed static resource negotiation algorithm. In the contents of all messages, we always include message type, source node ID, and target node ID. Only the additional information is listed in the table.

TABLE 1

Messages used in distributed static resource negotiation

| Message | Contents | Comments |
| --- | --- | --- |
| Msg.Usage | Source resource bitmap | This message is used to inform a neighbor node about the resource usage in the current node |
| Msg.Request | Source resource bitmap, target resource bitmap, requested resource bitmap, priority of the request | A node uses this message to request for resources. It contains a list or resources requested from the target node |
| Msg.Grant | Granted resource bitmap | In response to a Msg.Request message, a node can use this message to acknowledge the request from a neighbor node. It can individually grant some of the resources in the request. It also contains the time that the grant will start to be effective. |

TABLE 1-continued

Messages used in distributed static resource negotiation

| Message | Contents | Comments |
| --- | --- | --- |
| Msg.GrantAck | Granted resource bitmap from the target node. Adopted resource bitmap. | This is in response to a Msg.Grant message. A node sends this to all neighbors from which Msg.Grant is received to indicate the grant is accepted. It can individually acknowledge the acceptance of some of the resources granted. The un-successful resources will be assumed returned to the neighbor node. The acknowledgement shall include a time that the resource will start to be used. This time shall be no earlier than the time in the ResourceGrant message. |
| Msg.Reject | Source resource bitmap | This is in response to a request message, where the node refuses to grant what is requested. |
| Msg.GrantReject | N/A | This is in response to a grant message, where the node refuses to accept the grant. This is used when the request is abandoned or some the neighbors requested rejected the request. |

Figure 15:
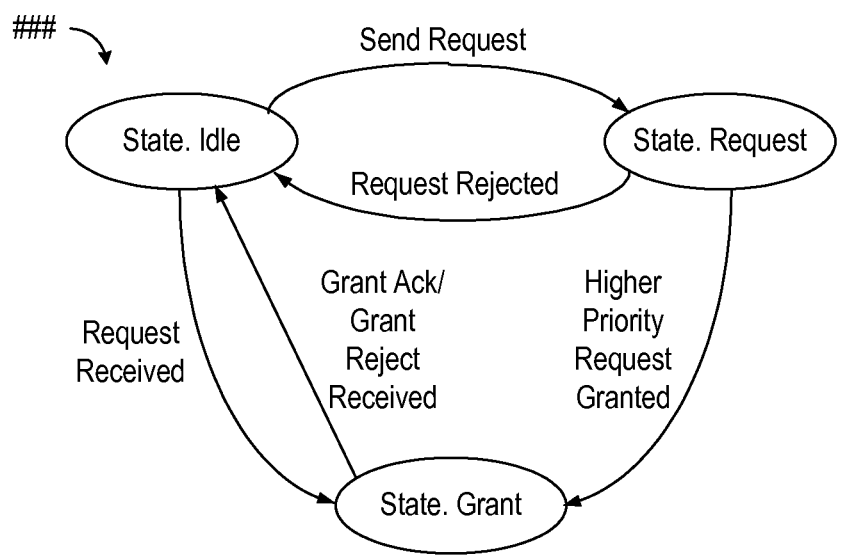
FIG. 15 depicts a negotiation state transfer diagram.

In FIG. 15, a negotiation state transfer diagram 1500 depicts three defined states State.Idle 1502, State.Request 1504, and State.Grant 1506.

The node keeps track of the resource usage of neighbor nodes. The resource usage message will be sent to neighbors either periodically or when the resource usage is changed. Idle state 1502 can move to Request state 1504 as depicted at 1508 ("Send request"), where there is confliction to resolve, some unused resource to claim, etc. A request message is sent to all neighbor nodes involved.

As depicted at 1510, the Idle mode 1502 can also move to Grant mode 1506 when a request message is received and the node agrees to grant the request. A grant message is sent back the node requesting the resources. If the node refuses to grant the request, it can send back a reject message and stays in Idle mode 1502 as depicted at 1512.

In the request mode 1504, the node may receive request messages from other neighbors. At this time, the node can decide whether it wants to reject these requests and stick with its own request as depicted at 1514, or abandon its request and grant the request from others as depicted at 1516. This can be decided by the priority field of the requests. The higher priority request will be kept. There are many ways to define the priority, such as using the number of resources owned, or even a random number.

If the node abandons its own request and grants another request as depicted at 1516, it will move the grant mode 1506. All previously received grants for its own request will be rejected by sending GrantReject message as depicted at 1518. Care must be taken to reject all grants received in the future related to the request.

If the node receives all grants from neighbor nodes it sends requests to, it can check what are the actual resources granted. It will send GrantAck messages to all these neighbors to inform them what are the actually accepted resources as depicted at 1518. These may be different from what is granted for different neighbor that grant different resources.

If the node receives at least one reject message from one neighbor in Request state 1504, it will abandon the request and returns to Idle mode 1502 as depicted at 1520. At the same time, all already received grants and grants to be received for this request will be rejected.

Now we are ready to describe how the distributed resource assignment algorithm works. It is easier to describe to algorithm assuming the edges of the graph are added one-by-one. This corresponds to the case that ATs are joining the system one-by-one.

Initially, we have graph with no edges. All nodes are not connected. This corresponds to the case that we do not have ATs in the system. In this case, all nodes can use all the resources. Then gradually, ATs start to feedback Pilot-Strength reports and the nodes start to discover each other. They will notice the confliction in resource usage and start the negotiation to settle them. The process can be better described using a few examples.

In the following examples, N equal size resources are assumed. The resource usage in each node can be represented by a binary vector of length N. In the conflict resolving, the nodes at the two end of the branch intend to have equal resource split between them.

Figure 16:
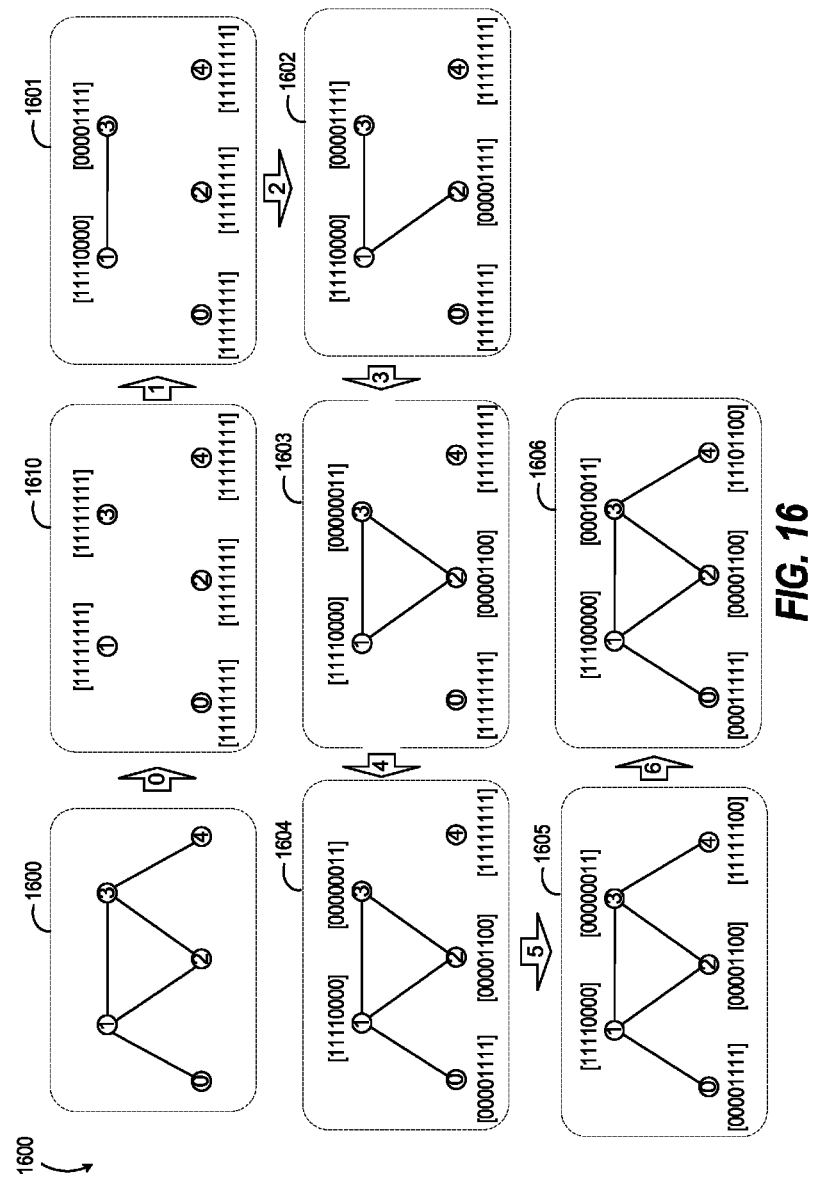
FIG. 16 depicts a process for distributed resource negotiation of eight resources for the node association of FIG. 1.

FIG. 16 shows distributed resource negotiation process 1600 for the example in FIG. 11 depicted at 1602, assuming totally 8 resources. The entire process can be described by the following seven (7) steps. Step 0 depicted at 1610: Initially, no AT in the system yet. Each node only sees itself. Each node can use all resources. Step 1 depicted at 1601: Nodes 1 and 3 discover each other. After negotiation using the resource request and grant mechanism, they agree to split the resources equally. Step 2 depicted at 1602: Nodes 1 and 2 discover each other. Node 2 uses resource claim mechanism to claim the resource that is not used by node 1. Step 3 depicted at 1603: Nodes 2 and 3 discover each other. Using resource request/ grant, they split the resource equally between each other. Step 4 depicted at 1604: Nodes 0 and 1 discover each other. Node 0 uses resource claim mechanism to use the resources not used by node 1. Step 5 depicted at 1605: Nodes 3 and 4 discover each other. Node 4 uses resource claim mechanism to use the resources not used by node 3. Step 6 depicted at 1606: Node 3 feels it is unfairly treated. It has 2 resources while its neighbor node 1 has 3 and node 4 has 6. It uses resource request/grant mechanism to request one resource from nodes 1 and 4. It will not request resource from node 2 for it knows that node 2 also only has 2 resources. After node 1 grants one resource to node 3, node 0 uses resource claim mechanism to claim one more resource.

In the end, we have 5, 3, 2, 3, and 5 resources for nodes 0, 1, 2, 3, and 4 respectively. The average reuse factor is 0.45. This happens to be the optimum assignment under $L_2$ matching to uniform resource assignment. In general, the optimality cannot be guaranteed.

Different update message passing procedures may give different results. For example, if we swap the resources used by nodes 1 and 2, node 0 will be able to use 6 resources instead of 5 and the average system reuse factor can be increase to 0.475.

The assumption that the edges are added one-by-one is just for simplicity of the example. It is not necessary.

The above algorithm is implemented in a simulator. The message propagation delay is modeled as uniformly distributed from 0 to 1.

Figure 17:
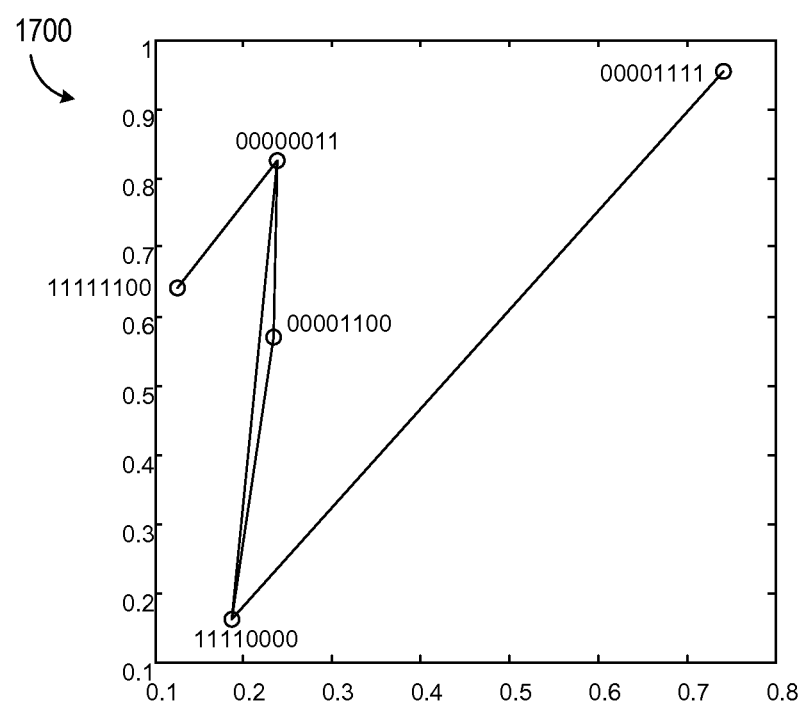
FIG. 17 depicts a graph of simulated node topology for the example of FIG. 11.
Figure 18:
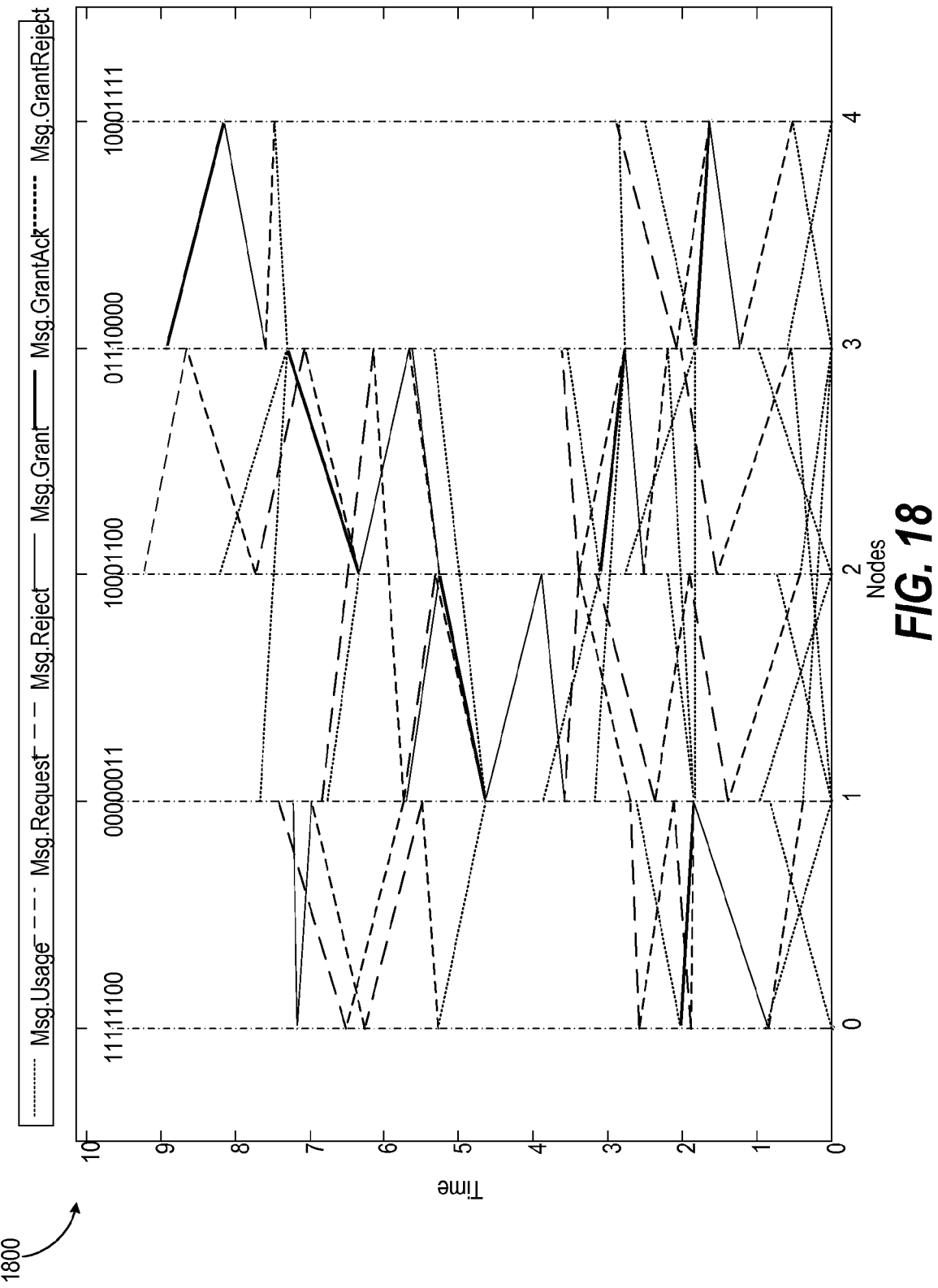
FIG. 18 depicts a graph of simulated propagation delay for the example of FIG. 11.

For the example in FIG. 11, the simulation results are shown at 1700 and 1800 respectively in FIGS. 17-18. Note that the jamming graph has the same topology as in FIG. 11, but different shape, due to the fact that we use random locations for the nodes when plotting them.

Figure 19:
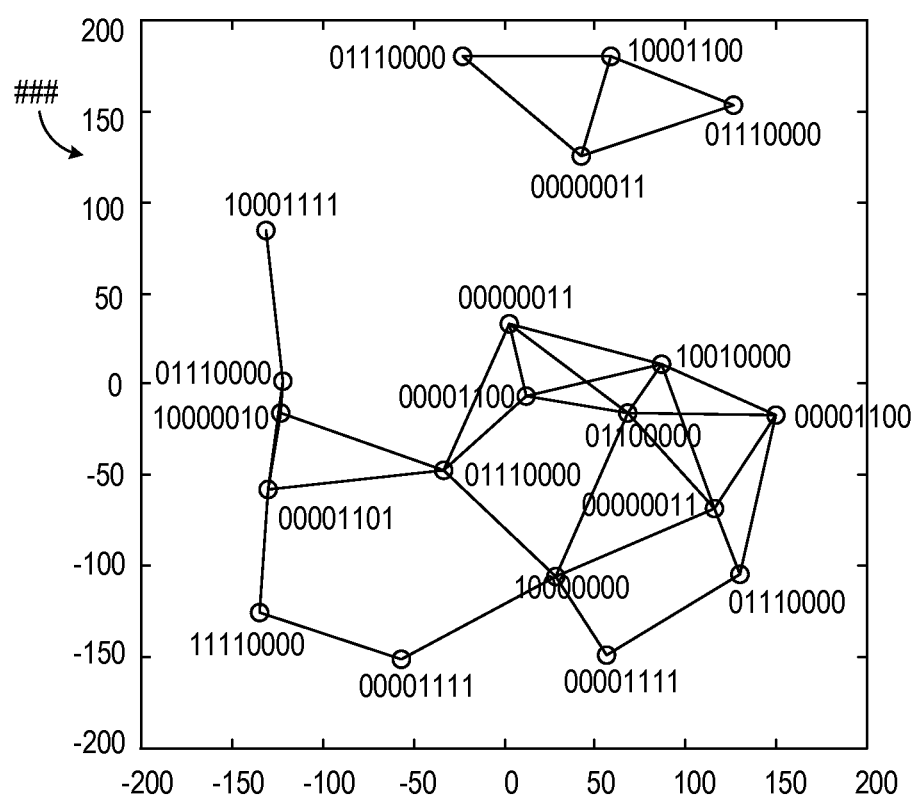
FIG. 19 depicts a graph of a more complicated simulated experiment using twenty nodes.

A more complex simulation was performed where a more complex example drops node in a circle with diameter 200 meters. Twenty (20) nodes are dropped and nodes within one hundred (100) meters from each other are considered connected. The result of one simulation run of this example is shown for a jamming graph at 1900 in FIG. 19. The first experiment was to drop 1000 independent drops with 20 nodes each with the distribution of the time needed for convergence being tracked, resulting in a median delay of around 25 ms and a mean delay of around 28 ms. These statistics are about the same order as the number of nodes in the system. However, there is a heavy tail in the distribution. With regard to the distribution of number of messages send per node, the mean was 48.4 ms and median was 41.7 ms; however, there is also a heavy tail in the distribution.

SEMI-STATIC (ALSO REFERRED TO AS "DYNAMIC" HEREIN) RESOURCE NEGOTIATION ALGORITHM. The static resource assignment discussed in the previous section provides a close to optimum resource reuse pattern that is advantageous when we have full buffer traffic; however, when the traffic is bursty, a node may be able to use more resource that the static resource assignment allows without causing any jamming. This is because the node it jams in the static case may not have anything to transmit at this time. However, we need to make sure this is the case before we actually transmit anything on the extra resource. This can be achieved by the dynamic resource negotiation algorithm described in this section.

In this section, the resources assigned to a node in the static resource assignment are considered to be "owned" by that node (the "owner"). The node serves as the "controller" for those resources.

BASIC DYNAMIC RESOURCE NEGOTIATION PROCESS. A semi-static (also referred to as "dynamic" herein) resource negotiation process is very simple. There are three basic actions: request, grant, and grant release.

When there is a packet arrives at a node, through the Msg.Usage message in the static resource negotiation algorithm, the node knows what resources its neighbors each has. However, the node does not know if they are using them or not. In order to find out, the node can send a request message to its neighbors.

Each neighbor node receives the request can decide if it can allow the requesting node to temporarily use the resources it owns. If it agrees, it can send a grant message back. If the node refuses to grant the resource, it can send back an empty grant, which is equivalent to a reject.

When the requesting node receives the grant, it can start to use the resources in the grant. When the transmission is done, the node needs to release the grant back to the owner, so the owner can use it in the future.

The idea of resource negotiation is not complex. However there are many design details needs to be considered to make the system work. The more detailed analysis is given in the next subsection.

DETAILED DESIGN FOR THE DYNAMIC RESOURCE NEGOTIATION ALGORITHM. The detailed design can be better described with some examples.

Figure 20:
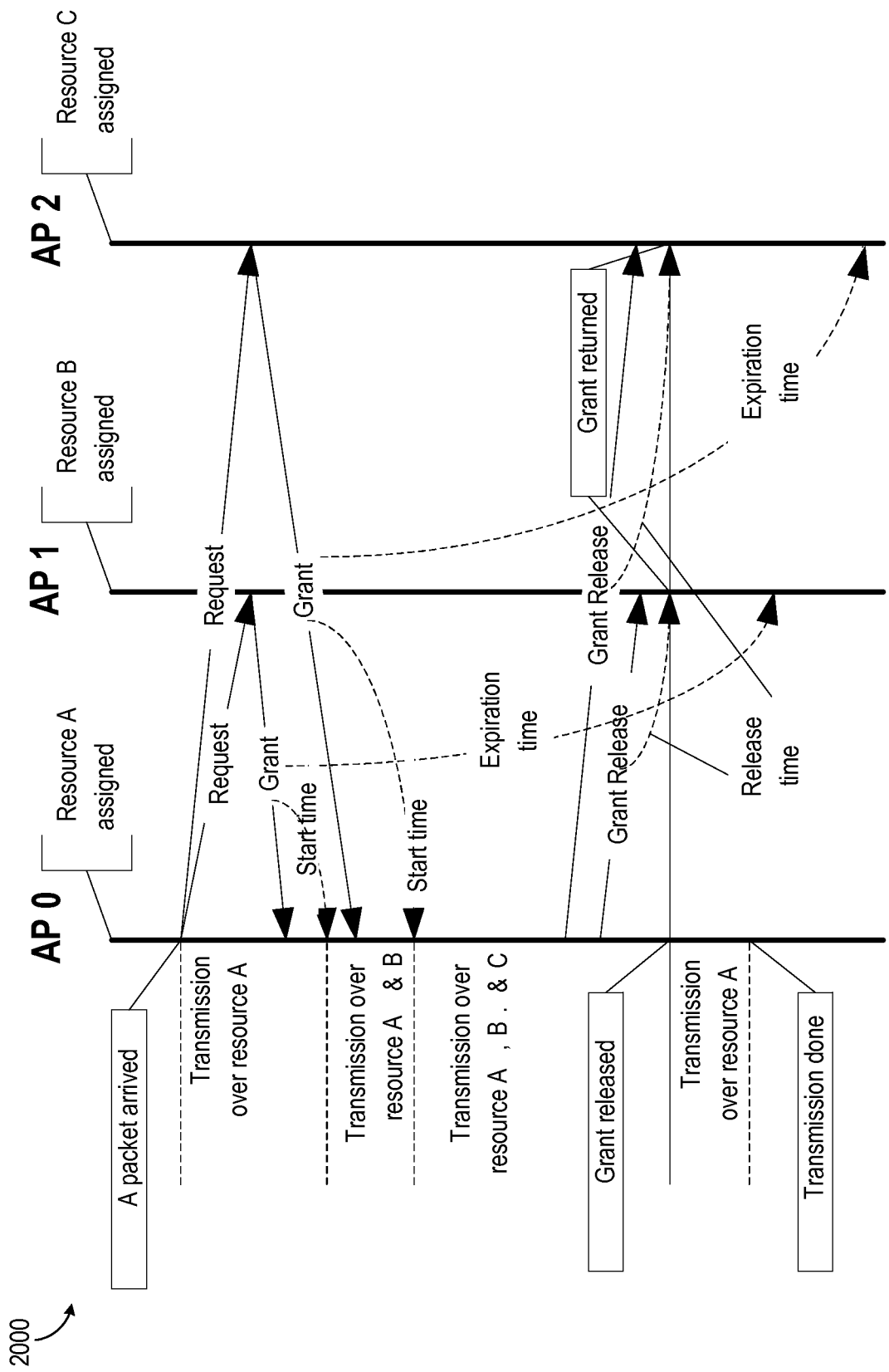
FIG. 20 depicts a timing diagram of a request/grant process for a node requesting different resources from different neighbors.

NODE REQUESTS DIFFERENT RESOURCES FROM DIFFERENT NEIGHBORS. In FIG. 20, an example for a request/grant process 2000 depicted as a timeline when a node requests different resources from different neighbors and. In this example, there are three nodes, each having one distinct static resource. Node AP0 2002 has a packet to transmit and nodes AP1 2004 and AP2 2006 have no traffic. Initially, the resources are at their static locations.

When the packet arrives at the node AP0 2002 as depicted at 2006, the transmission can start at once using resource A as depicted at 2008, which is owned by node AP0 2002.

We assume the node AP0 2002 can estimate the backhaul delay to each neighbor node 2004, 2006. The estimation can be done using the backhaul delay measurement from previous messages. Each message contains a time stamp which marks the time it is transmitted. The backhaul delay estimation can use information from all received messages if we assume all message delays are independently distributed. If we assume the backhaul delay to different neighbors are differently distributed, it might be better to use one estimator for the link to each neighbor node.

If the packet size is very small, it may not worthwhile to request more resources. This especially applicable when the backhaul delay is relatively large wherein the transmission is already done when the grant comes. Therefore, request will be sent only when necessary.

When a neighbor node receives the request, it can decide whether it wants to grant the request or not. A request can be granted if the node has nothing to transmit. It can also be granted if there is something to transmit but it will be finished very soon. It is also possible to grant the request if the resource is loaned to a third node, but the grant will be returned soon. The start time of the grant can be set to when the resource is actually available to avoid wasting it. Furthermore, the owner does not want the resource to be stuck in the requester. It is advantageous to add an expiration time for the grant so that the grant can be automatically returned after that time. The expiration time can be set such that the transmission at the requesting node can be finished right before that. In order to estimate the needed time to finish the packet, the request message needs to include the information such as the spectral efficiency and the number of resources already being used. Given these information, the granting node can compute how soon the transmission will be done if it grants the resource. Of course, if the transmission time is very long, the granting node may like to set the expiration time earlier to have more control over the resource. Then before the grant expires, the requesting node needs to send request again to renew the grant.

If the requesting node requests resource from multiple neighbors, the individual neighbor does not know the decision of other neighbors. When computing the expiration time of its grant, it can only assume it is the only neighbor that grants the request. Therefore, if multiple neighbor nodes grant the resource, the actual time the transmission is done might be earlier than each neighbor calculated and included in the grant. In order not to waste the resource, if the transmission finishes earlier, the requesting node shall send a grant release message back to the granting nodes to let them picking up the resource ahead of the expiration time.

Consider the backhaul delay, the grant release messages can be sent out slightly earlier than the transmission actually finishes. Therefore, the granting nodes can pick up the resources on time. Of course, this depends on how accurately the backhaul delay and serving speed are estimated.

RESOURCE CALL BACK MECHANISM. If the owner wants its resources back before the expiration time of the grants it sends out, it can send out special messages to the neighbors it loaned its resources to. This can be implemented by sending a request message requesting its own resources. The neighbor node receives such request will notice that it is requesting its own resources, so the resource can be released before the grant expires.

Figure 21:
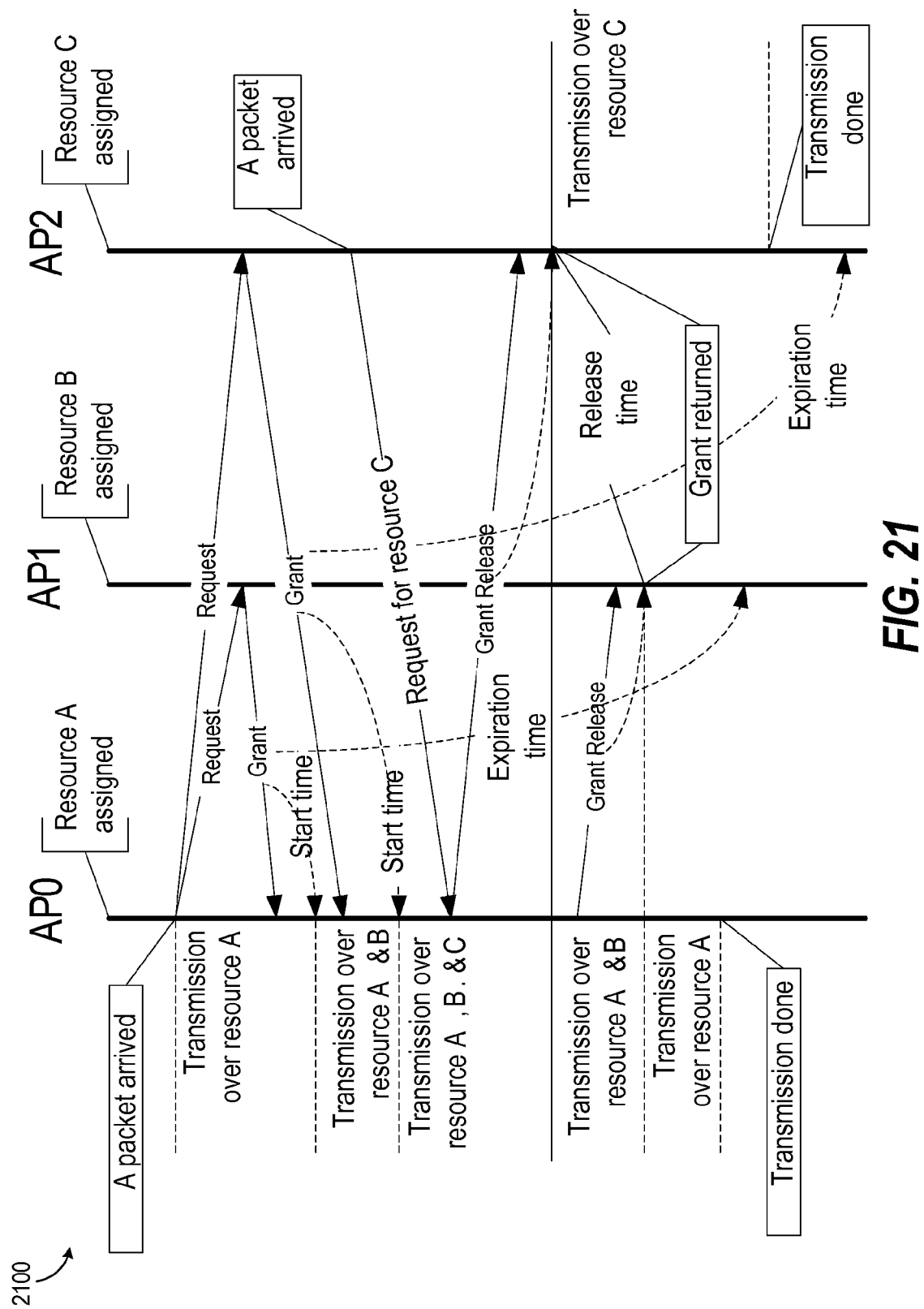
FIG. 21 depicts a timing diagram of node performing resource call back.

This resource call back process 2100 is demonstrated in FIG. 21 when an owner calls back its resources. The first part of the example is the same as in the previous example in FIG. 20. However, when a packet arrives at node AP2 2006, it decides to get it resource back by sending a request message depicted at 2102 for resource C to node AP0 2002. Node AP0 2002 notices that the request comes from the owner, so it has to obey by sending the grant release back as depicted at 2104.

Figure 22:
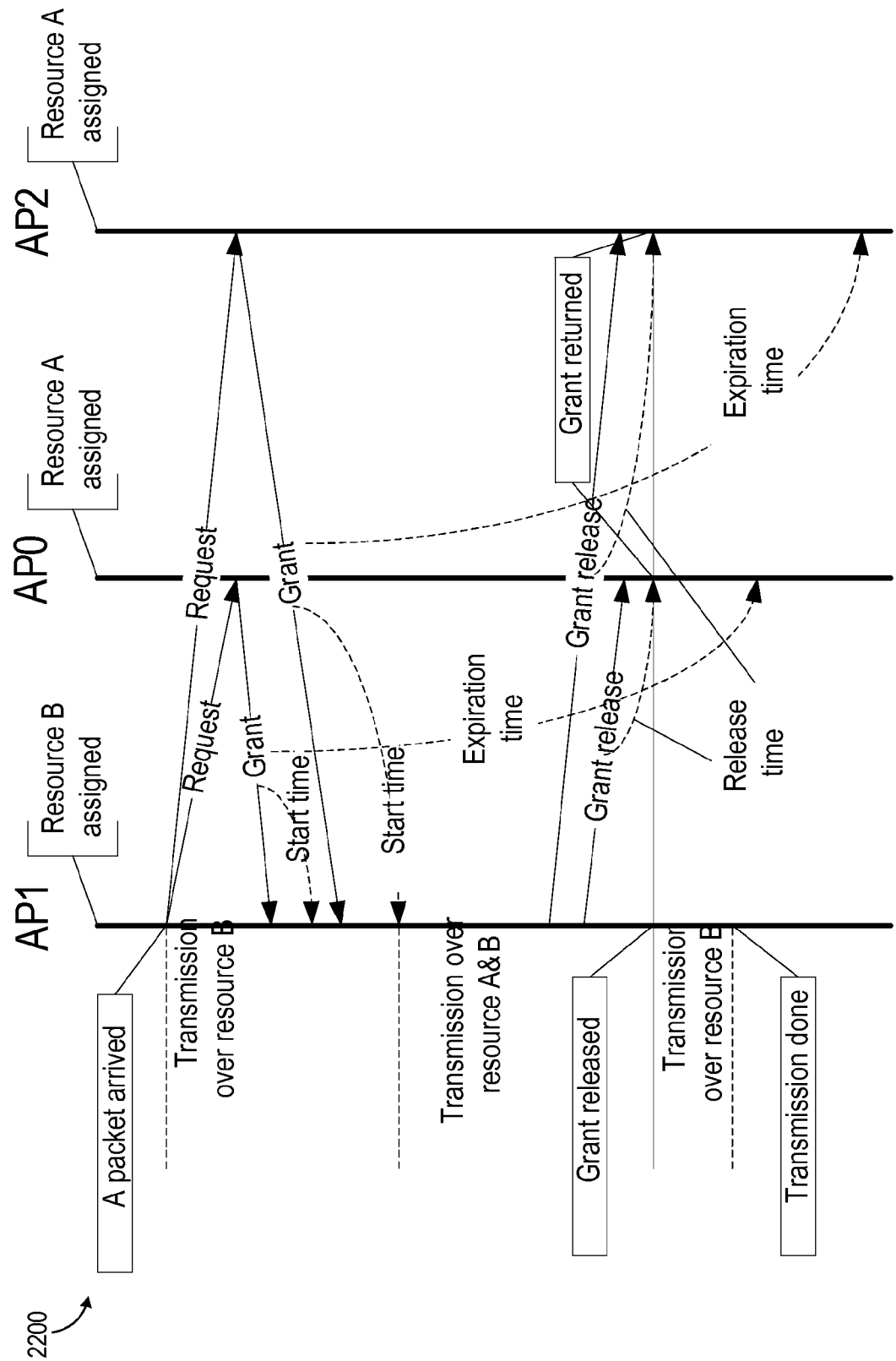
FIG. 22 depicts a timing diagram of a node requesting the same resources from different neighbors with all granting the request.
Figure 23:
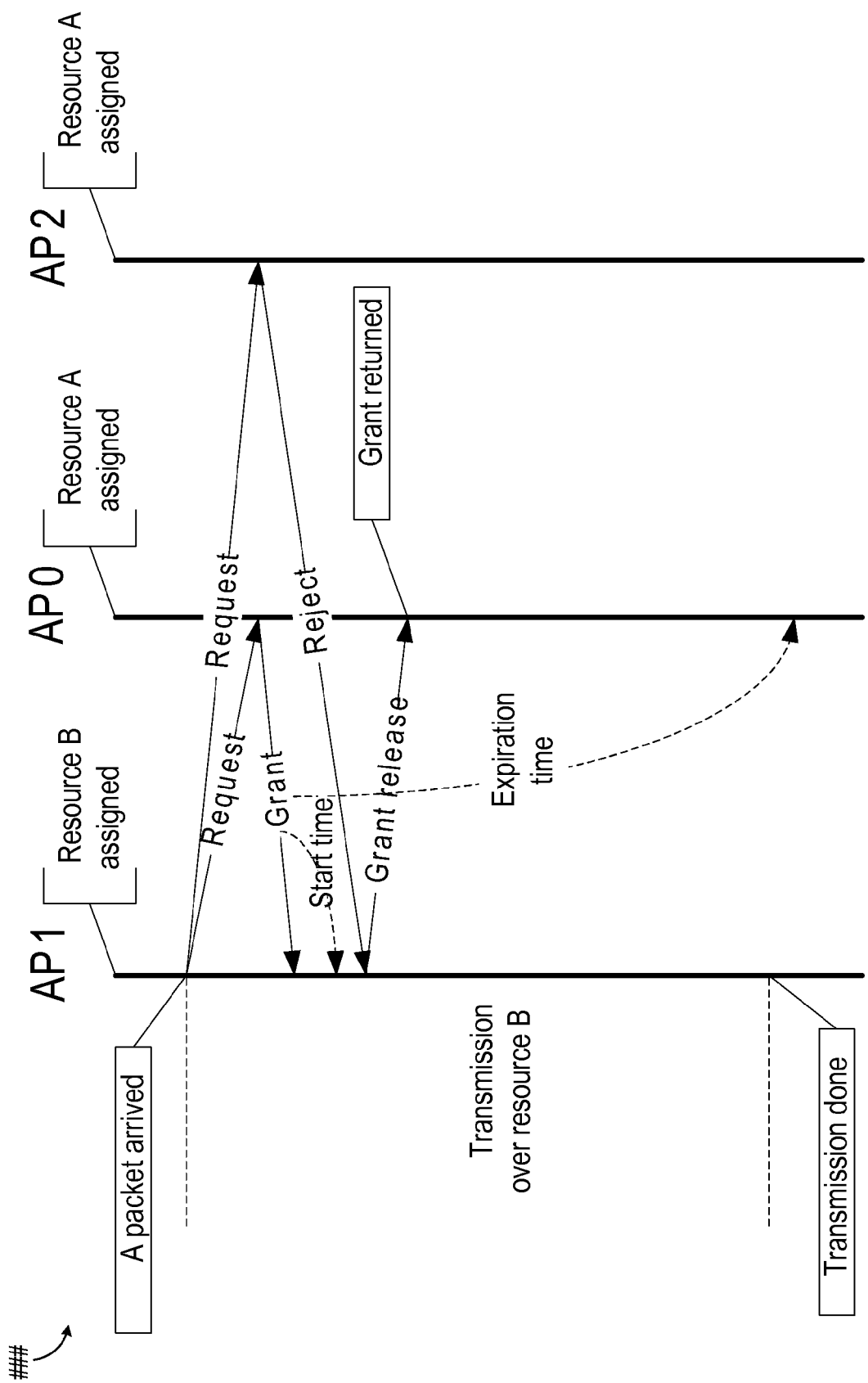
FIG. 23 depicts a timing diagram of a node requesting the same resources from different neighbors with one rejecting the request.

NODE REQUESTS THE SAME RESOURCE FROM DIFFERENT NEIGHBORS. It is possible that a resource is owned by more than one neighbor. In this case, in order to use the resource, a node needs to get the grant from all these neighbors. FIG. 22 is an example of resource request/grant timeline 2200 when a node AP0 2002 requests the same resource from different neighbors AP1 2004, AP2 2006 and they grant the request as depicted at 2202. FIG. 23 is an example of resource request/grant timeline 2300 when a node AP0 2002 requests the same resource from different neighbors AP1 2004, AP2 2006 and one of them rejects the request as depicted at 2302. As can be seen, when a node request a resource from multiple neighbor owners, all these neighbors must grant the request for the resource to be usable. If at least one owner rejects the request, the grant from other owners must be returned by sending grant release message back.

GRANT THE RESOURCE TO MULTIPLE NEIGHBORS. In some cases, it is possible and advantageous to grant the same resource to multiple neighbors. For example, in a macro/pico deployment, if a macro AP decides to grant a certain resource to a pico AP, it may be helpful to grant the same resource to another pico AP as well, even if the other pico AP has nothing to transmit at the time. In this way, if a packet arrives at the other pico AP, it does not need to wait for the round trip backhaul delay to request the resource.

In order to support this feature, we define a "persistent" grant. This can be implemented by adding a flag in the normal grant we discussed before. More precisely, for normal grants as discussed in the previous sections, the requesting node will release the grant when the transmission is done so that the owner can start to use it. However, for a persistent grant, the requesting node can keep the resource till the grant expires. In this way, if a packet arrives before the grant expires, the node can start using the resource instantly without requesting it first. This improves the resource usage when the owner of the resource has a lot of neighbors.

The node sending out persistent grants also needs the ability to renew its grant to its neighbors. For example, if the node grants the resource to one neighbor in the beginning and decides to grant the same resource to another neighbor with a later expiration time, it shall be able to send a message to the first neighbor to extend the expiration time of the grant to be aligned with the expiration time of the grant to the second neighbor. This can be implemented by sending another persistent grant without being requested.

Even with persistent grant, the owner will not loss control over its resource. If the owner has something to transmit itself, it can reject any new requests. Then it can pick up the resource when the all persistent grants expire. In addition, if the owner wants to get the resource back earlier than the expiration time, it can use the resource call back mechanism described before.

Figure 24:
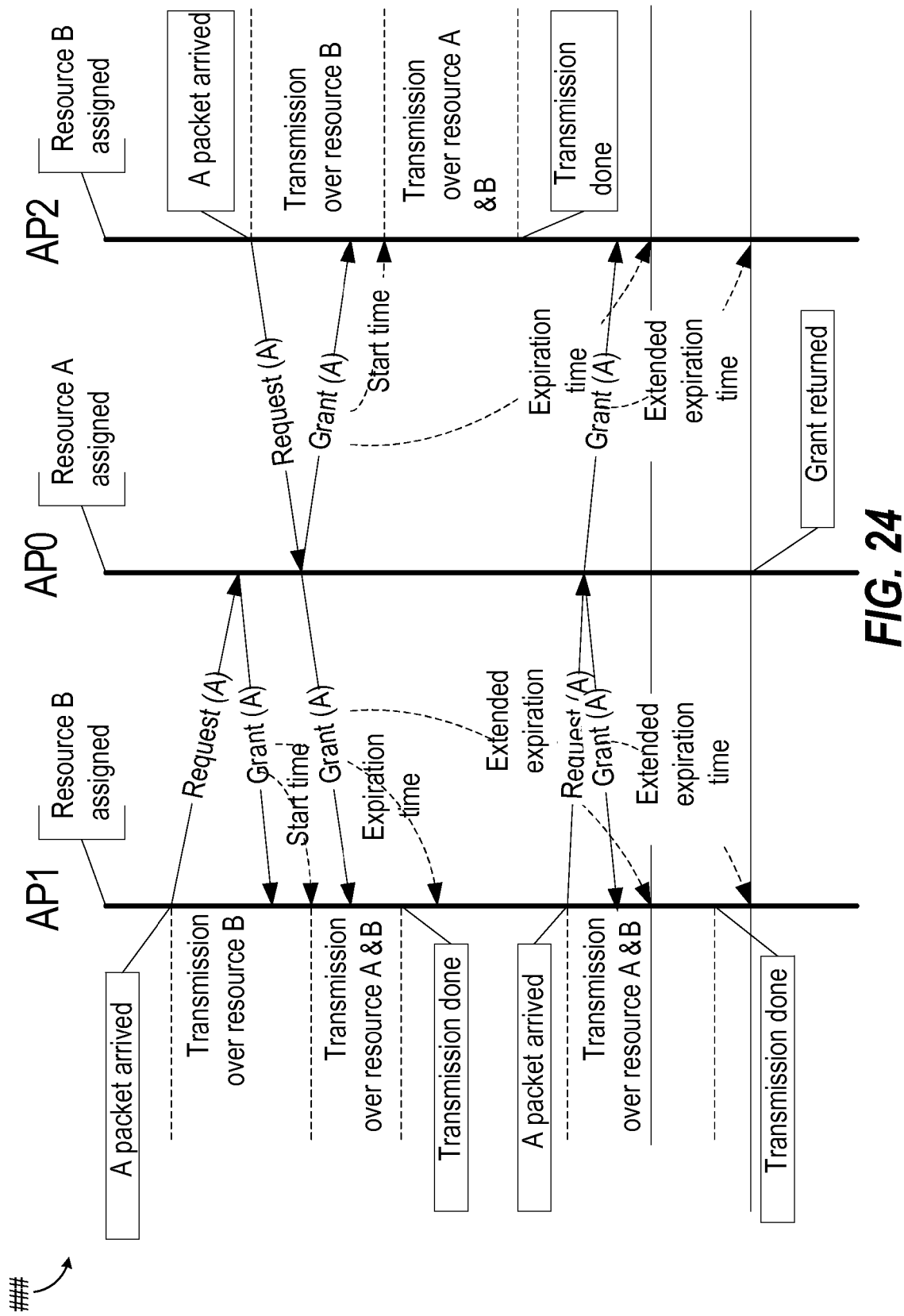
FIG. 24 depicts a timing diagram of methodology or sequence of operations for usage of persistent grants.

In FIG. 24, an exemplary methodology or sequence of operations 2400 is depicted for usage of persistent grants. We assume node AP0 (e.g., macro AP) 2402 is allowed to send persistent grants to nodes (e.g., femto or pico nodes) AP1 2404, AP2 2406. Initially, there is a packet arrives at AP1 2404 as depicted at 2410. In addition to sending the packet in its own resource as depicted at 2412, AP1 2404 requests resource from AP0 2402 as depicted at 2414. AP0 2402 grants the request as depicted at 2416. Later, AP2 2402 also has a packet to transmit 2406. It also requests resource from AP0 2402 as depicted at 2418. Since AP0 2402 already has granted the resource A to AP1 2404, and it knows granting the same resource to AP1 2404 and AP2 2406 will not cause any jamming by using the neighbor list information from AP1 and AP2, it can grant the same resource to AP2 2406 as depicted at 2420. The new grant 2420 has a later expiration time than the first grant 2416 to AP1 2404. Therefore, AP0 2402 can send another grant to AP1 2404 with the new expiration time to extend the original grant as depicted at 2422. When the packet transmission is finished in either AP1 2404 or AP2 2406, the grant is not returned. Before the extended expiration time is reached, AP1 2404 has another packet arrival as depicted at 2424. It can start to use resources A and B at once as depicted at 2426, instead of requesting resource A before starting using it. At the same time it also needs to send the request for resource A to AP0 2402 to extend the grant as depicted at 2426. When AP0 2402 receives the request as depicted at 2428, it sees the expiration time needs to be further extended, so grants are sent to both AP1 2404 and AP2 2406 to extend the previous grants as depicted respectively at 2428, 2430. When all packets in AP1 2404 and AP2 2406 are transmitted, there is no new request to AP0 2402. Thus, the grant will be returned after the latest expiration time as depicted at 2432.

In order for one node to be able to grant its resources to two different neighbors, it is necessary to be sure that these two neighbor nodes are not connected in the jamming graph. Otherwise, the two neighbor nodes will jam each other when they use the same resource granted. To achieve this, before granting the same resource to neighbors, the node will need the neighbor list information from these involved neighbors. Then it can avoid granting the resource to some nodes connected. To support this feature, we can add another field to the Msg.Usage message to include the neighbor list, in addition to the list of resources used. In the later sections, we will see this neighbor list information is useful in other scenarios as well.

THREE-HOP PROBLEM. In the dynamic resource negotiation algorithm discuss up to this point, the requests and grants are only based on the information in the Msg.Usage messages exchanged between neighbor nodes in the jamming graph. However, this is a limitation as shown in the next example.

Figure 25:
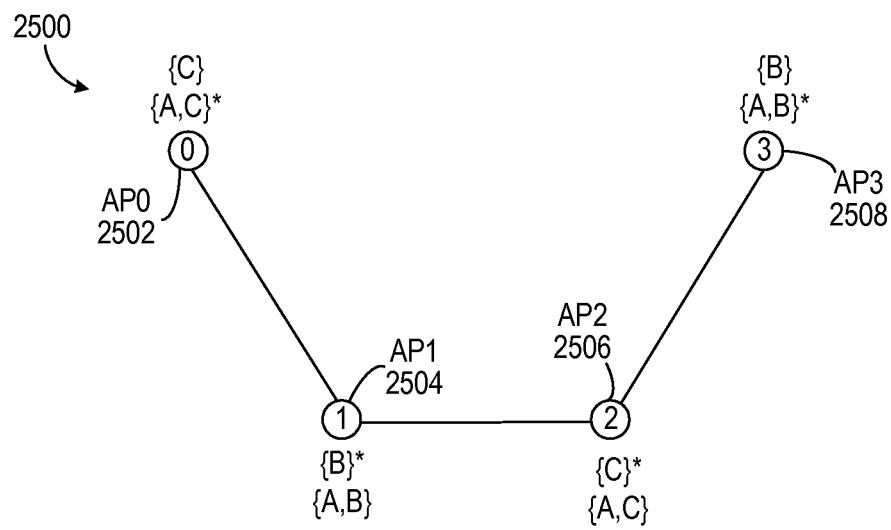
FIG. 25 depicts an exemplary jamming graph of four nodes with three-hop jamming annotated.
Figure 26:
FIG. 26 depicts a flow diagram of a methodology or sequence of operations for distributed resource assignment using a jamming graph.

In FIG. 25, an exemplary jamming graph 2500 has four nodes AP0 2502, AP1 2504, AP2 2506, and AP3 2508 given static resource assignments {A, C}, {B}, {C}, and {A, B} respectively. When node AP1 2504 has a packet to transmit, it requests resources from node AP0 2502 and node AP2 2506. Node AP2 2506 also has a packet to transmit, it requests resources from node AP1 2504 and node AP3 2508. Since node AP1 2504 and node AP2 2506 have some traffic, they rejects each other's requests. Node AP0 2502 and node AP3 2508 have nothing to transmit, and they grant the requests from node AP1 2504 and node AP2 2506 respectively. In the end, node AP1 2504 receives grant for resources A and C form node AP0 2502, but reject from node AP2 2506. Therefore, it accepts the grant on resource A from node AP0 2502 and release grant on resource C. Similarly, node AP2 2506 receives grants for resources A and B from node AP3 2508 and reject from node AP1 2504. Therefore it accepts the grant on resource A from node AP3 2508 and release the grant on resource B. The resource assignment in red in the figure shows the resource usage after these negotiations. It can be easily seen that there is a jamming between node AP1 2504 and node AP2 2506 for they both use resource A.

In general, this type of jamming may happen when the same resource is assigned to two nodes three hops away as the result of the static resource assignment algorithm (as in the node AP0 2502 and node AP3 2508 in the previous example). A jamming happens when these two nodes independently grant the common resource to the two nodes in the middle.

The reason why we have such jamming scenario is, in the dynamic negotiation algorithm discussed so far, each node only control the resources it owns. Then, as in the previous example, node AP1 2504 does not receive and any information about resource A from node AP2 2506, so it does not know node AP2 2506 is using that. Therefore, one way to avoid such jamming is to send the same request message (that includes the union of resources requested from all neighbors) to all neighbors, no matter if the neighbor owns the resource or not. When a node receives are request, for the resources in the request that it owns, it can decide to grant or reject as discussed before. However, for the resources in the request that the node does not own, it realizes that the requesting node is requesting these resources from some other neighbors. If the node itself is using the resource, it knows there will be jamming if the requesting node receives grants for the resource from some other neighbors. To stop this from happening, the node can send a reject message on the resource to the requesting node, though it does not own the resource. In the requesting node, if a reject on a resource is received from any of the neighbors (not necessarily the owner), the request on the resource is considered rejected and cannot be used.

It is possible that two neighbor nodes start to request for a resource none of them own at the same time. Then when the request to each other arrives, none of them are using the resource yet. These two nodes will see they are competing for the same resource when they receive the request. The confliction can be resolved by using some priority field in the request messages. One possible choice may be simply the sending time of the message. Whichever node sends the request first will have higher priority and send reject message to the other node. Of course, other priority mechanism can be used to resolve such conflicts.

Note that by requesting each resource from all neighbors, instead of the neighbors own the resource, grants from all neighbors are needed for the resource to be used. This may imply larger delay before the granted resources can be used. For example, if we model the round trip backhaul delay from each neighbor as a random variable, the earliest possible time for a resource to be usable is the maximum of all these random variable. The more neighbors we need to check, the larger the maximum becomes.

To reduce the delay to be able to use the resource, it is advantageous to reduce the number of grants needed to use a resource. This is possible when the neighbor lists of neighbors are available. If a node X is requesting a resource owned by a neighbor node Y, and it knows that another neighbor node Z is also connected to node Y, then the node X can expect the usage information of the resource from the node Y and it is not necessary to check with node Z. For example, if the resource is used by node Z, it must have been granted by node Y. Then for this request, node Y will decline the request and the rejection from node Z is redundant. We can either ignore the feedback from node Z on this resource, or do not send request on the resource to this node at all. Since node X may be requesting some other resource from node Y, the first option might be better.

A simple way to enable this delay reduction scheme is as follows: The requesting node will send request for all resources it is requesting to all neighbors. If a grant is received from a neighbor on the resource it owns, and the neighbor list of that neighbor is also available, the requesting node can assume the grants from all other nodes both in that neighbor list and its own neighbor list are received. A resource can be used when all grants are received, either directly from the neighbor or indirectly from the common neighbor that owns the resource.

JAM FACTOR. When a node requests a certain resource, all its neighbors that own the resource have to grant the request. In the distributed negotiation algorithm, each neighbor will make the decision independently. Therefore, the resource is less likely to be granted if more neighbor nodes own it. It will help a request node to make the decision on which resource to grant and on deciding the start/expiration time of the grant if it knows how many other nodes need to grant the resource for it to be usable. In order to achieve this, for each resource in the request message, we can add another field called jam factor, which is defined as the number of neighbors own the resource.

When a node receives a request message for a resource it owns, and the jam factor field for that resource is 1, the node knows if it grants the request, the resource will be usable. On the other hand, if the jam factor is larger than 1, the node knows the resource needs the grants from other neighbor nodes to be usable. In this case, the requested node may like to adjust the start and expiration time for it usually takes more time to collect all grants from more neighbors.

Jam factor can also help when making some other decisions.

By virtue of the foregoing, a methodology or sequence of operations 2600 is depicted for distributed resource assignment using a jamming graph. A node can start transmitting a packet through the resources it owns immediately (block 2602). Each backhaul message contains a timestamp, which marks the time it is transmitted (block 2604). A node can track the backhauls delays of previous messages using the time stamp in them (block 2606). These previous backhaul delays can be used to estimate the backhaul delay for the messages that will be transmitted. The estimation can simply use filters. We can apply one filter for all backhaul delays, or we can use one filter for the delays from each neighbor. The choice of method for backhaul estimation can depends on the model of backhaul connections. Requests need to be sent out only if the packet size is large enough compared to the backhaul delay (block 2608). Grant decision is based on local traffic (block 2610). Grant message contains start time and expiration time. The grant can be automatically returned at expiration time, to avoid losing control over the resource (block 2612). The starting time can be properly set to avoid resource waste (block 2614). The expiration time can be set using the information in the request message, so that the transmission can be approximately done by then (block 2616). If the transmission is very long, the granting node may like to set earlier expiration time to have tightly control over the owned resource. The requesting node can renew the grant by sending a request again before the previous grant expires (block 2618). Grant release message can be used to return the resource to its owner if the transmission is done before the expiration time (block 2620). If backhaul delay and serving speed can be accurately estimated, the grant release message can be sent before the transmission actually finish so that the owner can pick up the resource immediately when the transmission finishes (block 2622). An owner can send out a request message to get back its resource granted to a neighbor in a previous grant, before the expiration time in the grant is reached. Such request must be honored and is acknowledged by a grant release message (block 2624). If a resource is owned by multiple neighbor nodes, grants from all of them are needed for the resource to be usable (block 2626). If a resource request is rejected by one neighbor, the grant of the same resource from other neighbors can be return to avoid resource waste (block 2628). Persistent grant is supported such that the recipient of the grant does not need to return the grant with its transmission is finished. Instead, the grant will expire at the expiration time. A grant recall mechanism is supported so that the resource owner can ask the neighbor nodes to return the resource it granted ahead of the scheduled expiration time (block 2632). The grant recall mechanism can be implemented using a request message requesting the resource that the sending node owns. The grant recall has high priority and must be obeyed. The grant recall request is acknowledged by a grant release message (block 2636). A resource owner can extend a persistent grant without receiving a request message. The new expiration time is carried in the new persistent grant message (block 2634). When a node requests a certain resource, it has to send this request to all neighbors, including those neighbors that do not own the resource. For the neighbor does not own the resource, this mechanism provides a chance to avoid jamming caused by the three-hop problem (block 2636). When the neighbor lists of neighbors are available, it may not be always necessary to send request for a resource to a non-owner. A request to a neighbor is not needed when the resource being requested is owned by a common neighbor of the requesting node and the neighbor in question. An equivalent mechanism is to still sending the request to all nodes, but the requesting node does not need to wait for the grant from the neighbor who does not own the resource and has a neighbor node owns the resource where the neighbor node is also a neighbor of the requesting node. A simple way to implement this feature is still sending requests for all resources to all neighbors. However, when a grant is received from a neighbor that owns a resource and the neighbor list of that neighbor is available, the requesting node can assume all grants on the resource from nodes both in that neighbor list and its own neighbor list are received (block 2638). If two neighboring nodes are competing for the same resource that they both do not own, we can use some priority field to resolve the confliction. One possible choice is simply the sending time for the request (block 2640).

Figure 27:
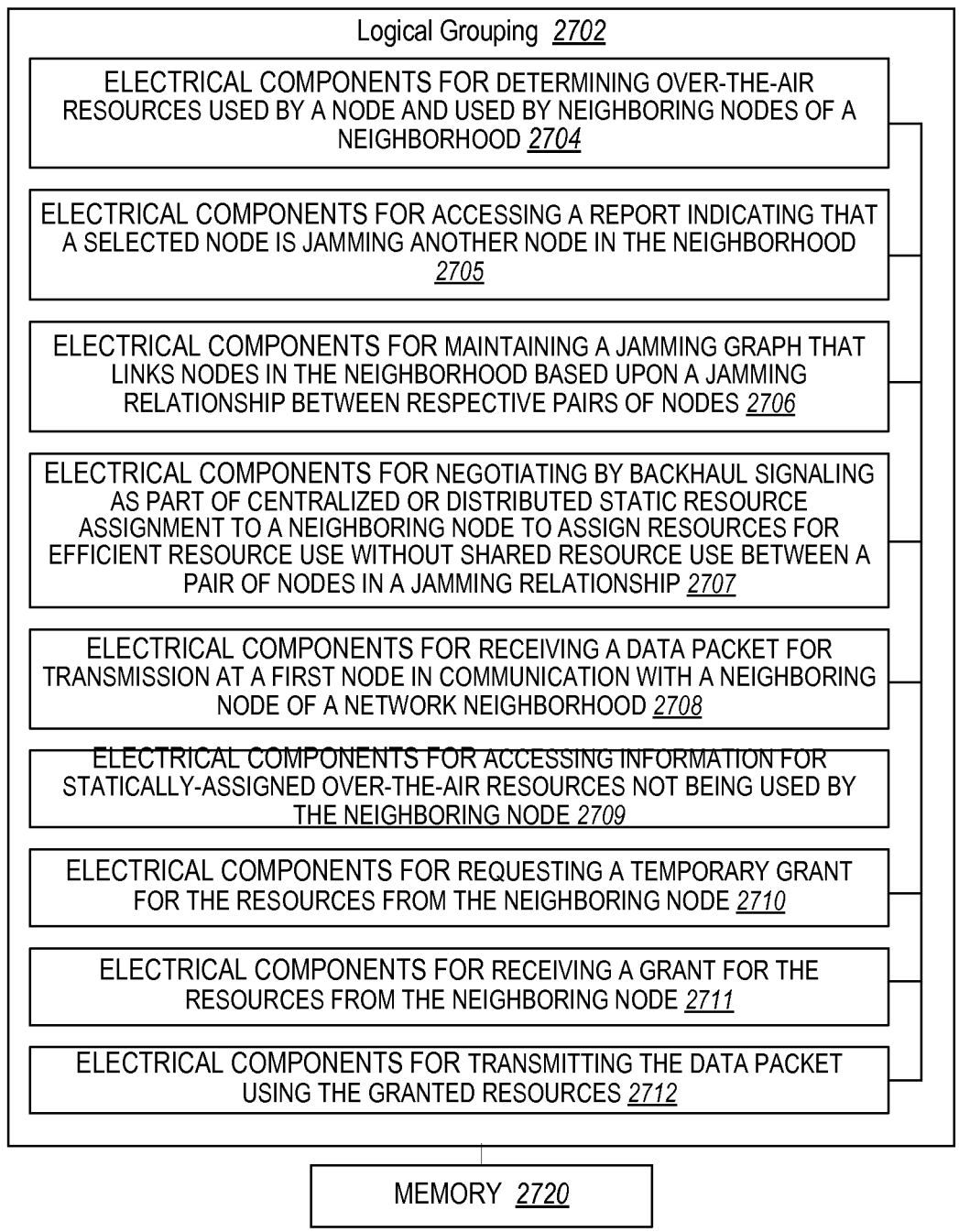
FIG. 27 depicts a system having logical groupings of electrical components for resource allocation based upon jamming graphs.

With reference to FIG. 27, illustrated is a system 2700 for allocating wireless resources between nodes and transmitting data packet communication as statically or dynamically assigned. For example, system 2700 can reside at least partially within a base station. It is to be appreciated that system 2700 is represented as including functional blocks, which can be functional blocks that represent functions implemented by a computing platform, processor, software, or combination thereof (e.g., firmware). System 2700 includes a logical grouping 2702 of electrical components that can act in conjunction. For instance, logical grouping 2702 can include an electrical component for determining over-the-air resources used by a node and used by neighboring nodes of a neighborhood 2704. Moreover, logical grouping 2702 can include an electrical component for accessing a report indicating that a selected node is jamming another node in the neighborhood 2705. Further, logical grouping 2702 can include an electrical component for maintaining a jamming graph that links nodes in the neighborhood based upon a jamming relationship between respective pairs of nodes 2706. Logical grouping 2702 can include an electrical component for negotiating by backhaul signaling as part of centralized or distributed static resource assignment to a neighboring node to assign resources for efficient resource use without shared resource use between a pair of nodes in a jamming relationship 2707. Logical grouping 2702 can include an electrical component for receiving a data packet for transmission at a first node in communication with a neighboring node of a network neighborhood 2708. Logical grouping 2702 can include an electrical component for accessing information for statically-assigned over-the-air resources not being used by the neighboring node 2709. Logical grouping 2702 can include an electrical component for requesting a temporary grant for the resources from the neighboring node 2710. Logical grouping 2702 can include an electrical component for receiving a grant for the resources from the neighboring node 2711. Logical grouping 2702 can include an electrical component for transmitting the data packet using the granted resources 2712. Additionally, system 2700 can include a memory 2720 that retains instructions for executing functions associated with electrical components 2704-2712. While shown as being external to memory 2720, it is to be understood that one or more of electrical components 2704-2712 can exist within memory 2720.

Figure 28:
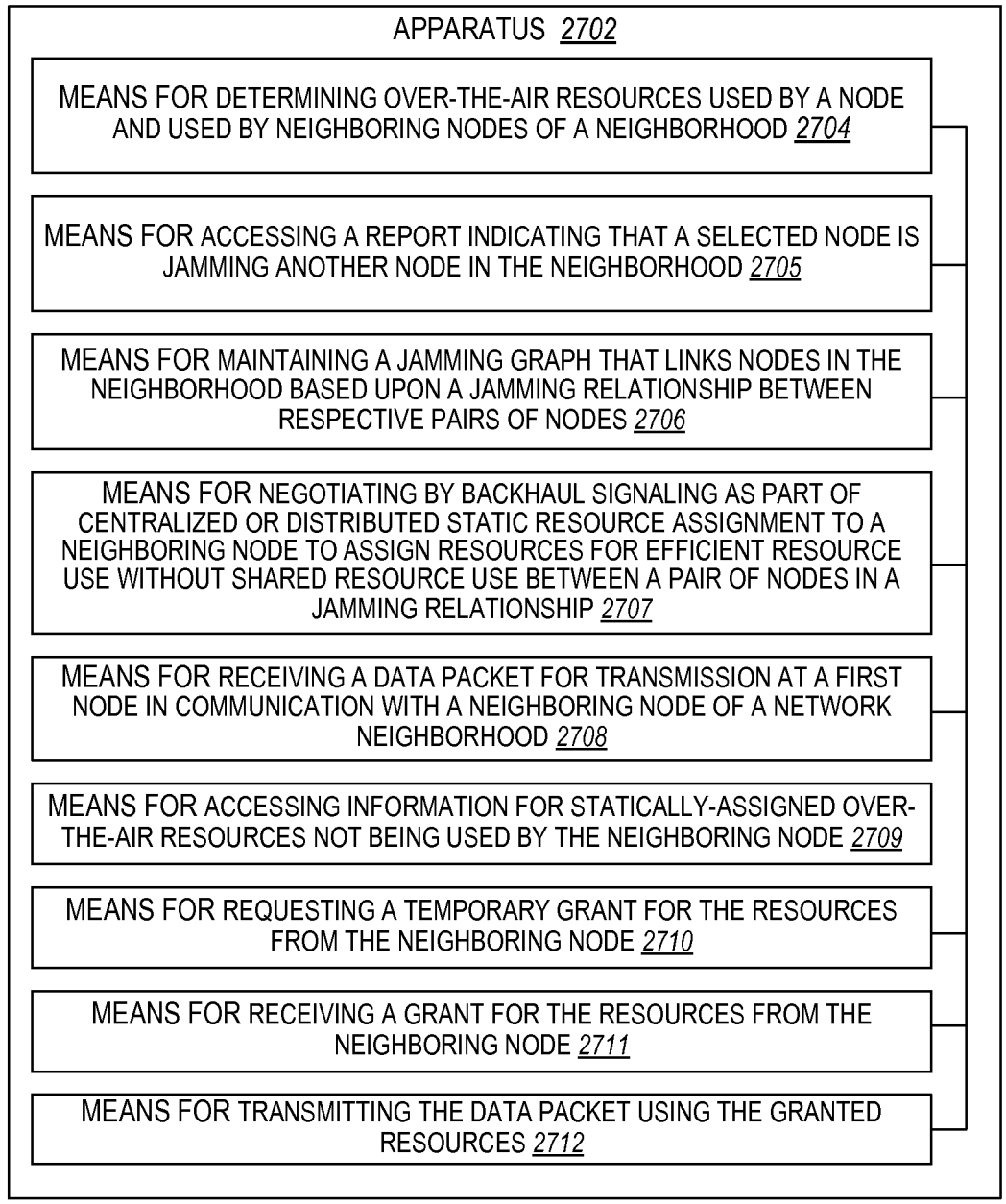
FIG. 28 depicts an apparatus having means for resource allocation based upon jamming graphs.

With reference to FIG. 28, an apparatus 2802 is provides for allocating wireless resources between nodes and transmitting data packet communication as statically or dynamically assigned. Means 2804 are provided for determining over-the-air resources used by a node and used by neighboring nodes of a neighborhood. Means 2805 are provided for accessing a report indicating that a selected node is jamming another node in the neighborhood. Means 2806 are provided for maintaining a jamming graph that links nodes in the neighborhood based upon a jamming relationship between respective pairs of nodes. Means 2807 are provided for negotiating by backhaul signaling as part of centralized or distributed static resource assignment to a neighboring node to assign resources for efficient resource use without shared resource use between a pair of nodes in a jamming relationship. Means 2808 are provided for receiving a data packet for transmission at a first node in communication with a neighboring node of a network neighborhood. Means 2809 are provided for accessing information for statically-assigned over-the-air resources not being used by the neighboring node. Means 2810 are provided for requesting a temporary grant for the resources from the neighboring node. Means 2811 are provided for receiving a grant for the resources from the neighboring node. Means 2812 are provided for transmitting the data packet using the granted resources.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

In addition, the various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Furthermore, the one or more versions may be implemented as a method, apparatus, or article of manufacture using standard programming and/or engineering techniques to produce software, firmware, hardware, or any combination thereof to control a computer to implement the disclosed aspects. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed aspects.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or media.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

What is claimed is:

1. A method for wireless communication, the method comprising:
    identifying a first node of a plurality of nodes that serves a first terminal of a plurality of terminals, the first node utilizing a first communication resource;
    identifying a second node of the plurality of nodes that interferes with the first terminal due to the second node utilizing the first communication resource;
    associating the first node with the second node to define a first association;
    assigning communication resources to the plurality of nodes and the plurality of terminals based on at least the first association, wherein a third node does not have a communication resource assigned;
    generating first information regarding the first association and one or more additional associations assuming the third node is assigned a second communication resource;
    generating second information regarding the first association and one or more additional associations assuming the third node is not assigned a second communication resource; and
    discarding the first information if the first information indicates the third node being assigned a second communication resource causes interference.

2. The method of claim 1, further comprising:
    identifying a second terminal of the plurality of terminals that is served by a fourth node of the plurality of nodes, the third node utilizing a third communication resource;
    identifying a third terminal of the plurality of terminals that is interfered with by the fourth node due to the fourth node utilizing the third communication resource;
    associating the second terminal with the third terminal to define a second association, wherein assigning the communication resources if further based on the second association.

3. The method of claim 2, wherein the fourth node is one of the first node and the second node, and wherein the first terminal is one of the second terminal and the third terminal.

4. The method of claim 1, further comprising generating information regarding the first association and one or more additional associations.

5. The method of claim 4, wherein the information comprises a jamming graph.

6. The method of claim 1, further comprising receiving a report indicating the second node of the plurality of nodes interferes with the first terminal.

7. The method of claim 1, wherein the communication resources comprise one or more of the following: times, frequencies, codes, and spatial resources.

8. The method of claim 1, wherein the assigning comprises optimizing selection of a resource assignment pattern than maximizes average reuse factor.

9. An apparatus of a wireless communication network, the apparatus comprising:
    a memory; and
    circuitry coupled to the memory, the circuitry and memory being cooperatively configured to:
        identify a first node of a plurality of nodes that serves a first terminal of a plurality of terminals, the first node utilizing a first communication resource;
        identify a second node of the plurality of nodes that interferes with the first terminal due to the second node utilizing the first communication resource;
        associate the first node with the second node to define a first association;
        assign communication resources to the plurality of nodes and the plurality of terminals based on at least the first association, wherein a third node does not have a communication resource assigned;
        generate first information regarding the first association and one or more additional associations assuming the third node is assigned a second communication resource;
        generate second information regarding the first association and one or more additional associations assuming the third node is not assigned a second communication resource; and
        discard the first information if the first information indicates the third node being assigned a second communication resource causes interference.

10. The apparatus of claim 9, wherein the circuitry and memory are further cooperatively configured to:
    identify a second terminal of the plurality of terminals that is served by a fourth node of the plurality of nodes, the fourth node utilizing a third communication resource;
    identify a third terminal of the plurality of terminals that is interfered with by the fourth node due to the fourth node utilizing the third communication resource;
    associate the second terminal with the third terminal to define a second association, wherein assigning the communication resources if further based on the second association.

11. The apparatus of claim 10, wherein the fourth node is one of the first node and the second node, and wherein the first terminal is one of the second terminal and the third terminal.

12. The apparatus of claim 9, wherein the circuitry and memory are further cooperatively configured to generate information regarding the first association and one or more additional associations.

13. The apparatus of claim 12, wherein the information comprises a jamming graph.

14. The apparatus of claim 9, wherein the circuitry and memory are further cooperatively configured to receive a report indicating the second node of the plurality of nodes interferes with the first terminal.

15. The apparatus of claim 9, wherein the communication resources comprise one or more of the following: times, frequencies, codes, and spatial resources.

16. The apparatus of claim 9, wherein the assigning comprises optimizing selection of a resource assignment pattern than maximizes average reuse factor.

17. An apparatus of a wireless communication network, the apparatus comprising:
    means for identifying a first node of a plurality of nodes that serves a first terminal of a plurality of terminals, the first node utilizing a first communication resource;
    means for identifying a second node of the plurality of nodes that interferes with the first terminal due to the second node utilizing the first communication resource;

means for associating the first node with the second node to define a first association;

means for assigning communication resources to the plurality of nodes and the plurality of terminals based on at least the first association, wherein a third node does not have a communication resource assigned;

means for generating first information regarding the first association and one or more additional associations assuming the third node is assigned a second communication resource;

means for generating second information regarding the first association and one or more additional associations assuming the third node is not assigned a second communication resource; and means for discarding the first information if the first information indicates the third node being assigned a second communication resource causes interference.

18. The apparatus of claim 17, further comprising:

means for identifying a second terminal of the plurality of terminals that is served by a fourth node of the plurality of nodes, the fourth node utilizing a third communication resource;

means for identifying a third terminal of the plurality of terminals that is interfered with by the fourth node due to the fourth node utilizing the third communication resource;

means for associating the second terminal with the third terminal to define a second association, wherein assigning the communication resources if further based on the second association.

19. The apparatus of claim 18, wherein the fourth node is one of the first node and the second node, and wherein the first terminal is one of the second terminal and the third terminal.

20. The apparatus of claim 17, further comprising means for generating information regarding the first association and one or more additional associations.

21. The apparatus of claim 20, wherein the information comprises a jamming graph.

22. The apparatus of claim 17, further comprising means for receiving a report indicating the second node of the plurality of nodes interferes with the first terminal.

23. The apparatus of claim 17, wherein the communication resources comprise one or more of the following: times, frequencies, codes, and spatial resources.

24. The apparatus of claim 17, wherein the means for assigning comprises means for optimizing selection of a resource assignment pattern than maximizes average reuse factor.

25. A computer program product comprising:

a non-transitory computer readable medium comprising:

code for causing a computer to identify a first node of a plurality of nodes that serves a first terminal of a plurality of terminals, the first node utilizing a first communication resource;

code for causing a computer to identify a second node of the plurality of nodes that interferes with the first terminal due to the second node utilizing the first communication resource;

code for causing a computer to associate the first node with the second node to define a first association;

code for causing a computer to assign communication resources to the plurality of nodes and the plurality of terminals based on at least the first association, wherein a third node does not have a communication resource assigned;

code for causing a computer to generate first information regarding the first association and one or more additional associations assuming the third node is assigned a second communication resource;

code for causing a computer to generate second information regarding the first association and one or more additional associations assuming the third node is not assigned a second communication resource; and code for causing a computer to discard the first information if the first information indicates the third node being assigned a second communication resource causes interference.

26. A method for wireless communication, the method comprising:

communicating with a first node of a plurality of nodes that provides service to a first terminal of a plurality of terminals, the first node utilizing a first communication resource; and transmitting a report indicating a second node of the plurality of nodes interferes with the first terminal due to the second node utilizing the first communication resource, wherein communication resources are assigned to the plurality of nodes and the plurality of terminals based on at least a first association between the first node and the second node and further based on at least a second association between the first terminal and a second terminal that the first node interferes with due to the first node utilizing the first communication resource.

27. The method of claim 26, wherein communication resources are assigned to the plurality of nodes and the plurality of terminals further based on one or more additional associations.

28. The method of claim 26, wherein the first association is part of a jamming graph.

29. The method of claim 26, wherein the communication resources comprise one or more of the following: times, frequencies, codes, and spatial resources.

30. An apparatus of a wireless communication network, the apparatus comprising:

a memory;

circuitry coupled to the memory, the circuitry and memory being cooperatively configured to:

communicate with a first node of a plurality of nodes that provides service to a first terminal of a plurality of terminals, the first node utilizing a first communication resource; and transmit a report indicating a second node of the plurality of nodes interferes with the first terminal due to the second node utilizing the first communication resource, wherein communication resources are assigned to the plurality of nodes and the plurality of terminals based on at least a first association between the first node and the second node and further based on at least a second association between the first terminal and a second terminal that the first node interferes with due to the first node utilizing the first communication resource.

31. The apparatus of claim 30, wherein communication resources are assigned to the plurality of nodes and the plurality of terminals further based on one or more additional associations.

32. The apparatus of claim 30, wherein the first association is part of a jamming graph.

33. The apparatus of claim 30, wherein the communication resources comprise one or more of the following: times, frequencies, codes, and spatial resources.

34. An apparatus of a wireless communication network, the apparatus comprising:

means for communicating with a first node of a plurality of nodes that provides service to a first terminal of a plurality of terminals, the first node utilizing a first communication resource; and means for transmitting a report indicating a second node of the plurality of nodes interferes with the first terminal due to the second node utilizing the first communication resource, wherein communication resources are assigned to the plurality of nodes and the plurality of terminals based on at least a first association between the first node and the second node and further based on at least a second association between the first terminal and a second terminal that the first node interferes with due to the first node utilizing the first communication resource.

35. The apparatus of claim 34, wherein communication resources are assigned to the plurality of nodes and the plurality of terminals further based on one or more additional associations.

36. The apparatus of claim 34, wherein the first association is part of a jamming graph.

37. The apparatus of claim 34, wherein the communication resources comprise one or more of the following: times, frequencies, codes, and spatial resources.

38. A computer program product comprising:

a non-transitory computer readable medium comprising:

code for causing a computer to communicate with a first node of a plurality of nodes that provides service to a first terminal of a plurality of terminals, the first node utilizing a first communication resource; and code for causing a computer to transmit a report indicating a second node of the plurality of nodes interferes with the first terminal due to the second node utilizing the first communication resource, wherein communication resources are assigned to the plurality of nodes and the plurality of terminals based on at least a first association between the first node and the second node and further based on at least a second association between the first terminal and a second terminal that the first node interferes with due to the first node utilizing the first communication resource.

* * * * *